United States Patent
Shiga

(10) Patent No.: US 7,581,083 B2
(45) Date of Patent: Aug. 25, 2009

(54) OPERATION PROCESSING DEVICE, SYSTEM AND METHOD HAVING REGISTER-TO-REGISTER ADDRESSING

(75) Inventor: Tomohisa Shiga, Kanagawa (JP)

(73) Assignee: Sony Corporation, Tokyo (JP)

( * ) Notice: Subject to any disclaimer, the term of this patent is extended or adjusted under 35 U.S.C. 154(b) by 407 days.

(21) Appl. No.: 10/508,802

(22) PCT Filed: Mar. 26, 2003

(86) PCT No.: PCT/JP03/03716

§ 371 (c)(1), (2), (4) Date: Sep. 23, 2004

(87) PCT Pub. No.: WO03/081422

PCT Pub. Date: Oct. 2, 2003

(65) Prior Publication Data

US 2005/0149556 A1 Jul. 7, 2005

(30) Foreign Application Priority Data

Mar. 27, 2002 (JP) ............................. 2002-088916
Jul. 3, 2002 (JP) ............................. 2002-195123

(51) Int. Cl.
*G06F 9/30* (2006.01)
*G06F 9/40* (2006.01)

(52) U.S. Cl. ........................... 712/210; 712/218; 711/3; 710/1

(58) Field of Classification Search ..................... 710/3; 711/1; 712/218

See application file for complete search history.

(56) References Cited

U.S. PATENT DOCUMENTS 5,493,239 A * 2/1996 Zlotnick ...................... 326/38
5,890,222 A * 3/1999 Agarwal et al. ............. 711/220
7,023,744 B1 * 4/2006 Shimanek et al. ...... 365/189.11

FOREIGN PATENT DOCUMENTS

JP 62-251930 11/1987

(Continued)

OTHER PUBLICATIONS

Computer Organization and Design: The Hardware/Software Interface; John Hennessy and David Patterson, 1997.*

(Continued)

*Primary Examiner*—Niketa I Patel
*Assistant Examiner*—Jesse R Moll
(74) *Attorney, Agent, or Firm*—Frommer Lawrence & Haug LLP; William S. Frommer

(57) ABSTRACT

As shown in FIG. 1, an operation-processing device of the present invention comprises a register array (11) having plural registers for holding an arbitrary value based on a write address Aw and a write control signal Sw and outputting this value based on a read address Ar, an ALU (12) for performing operations on this value, a decoder (13) for decoding an operation instruction from an operation program AP for operating this ALU (12), and an instruction-execution-controlling portion (50) for controlling the register array (11) and the ALU (12) in order to execute this operation instruction, wherein this instruction-execution-controlling portion (50) selects one of the registers based on the operation instruction and performs register-to-register addressing processing that, based on a value held by this selected register, selects another register.

9 Claims, 25 Drawing Sheets

FOREIGN PATENT DOCUMENTS

| | | |
|---|---|---|
| JP | 03-099321 | 4/1991 |
| JP | 4-91519 | 3/1992 |
| JP | 5-55907 | 3/1993 |
| JP | 10-320172 | 12/1998 |
| JP | 2000-105759 | 4/2000 |
| WO | WO 00/19329 | 4/2000 |

OTHER PUBLICATIONS

8051 Tutorial: Addressing Modes; Vault Information Services; Archived on the Internet Archive Feb. 15, 2001.*

Integrated Circuits; ScienCentral, Inc, and The American Institute of Physics; 1999.*

* cited by examiner

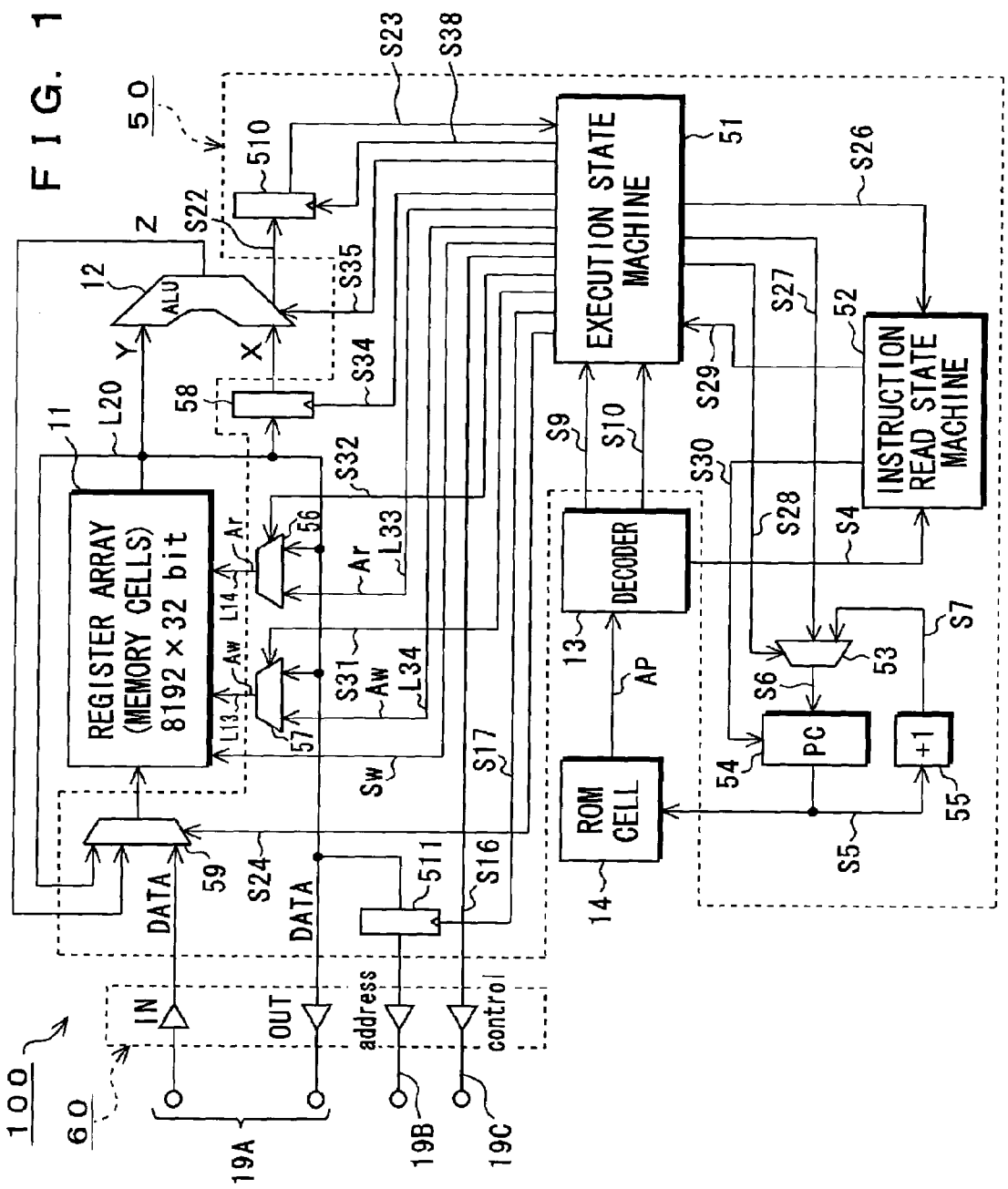

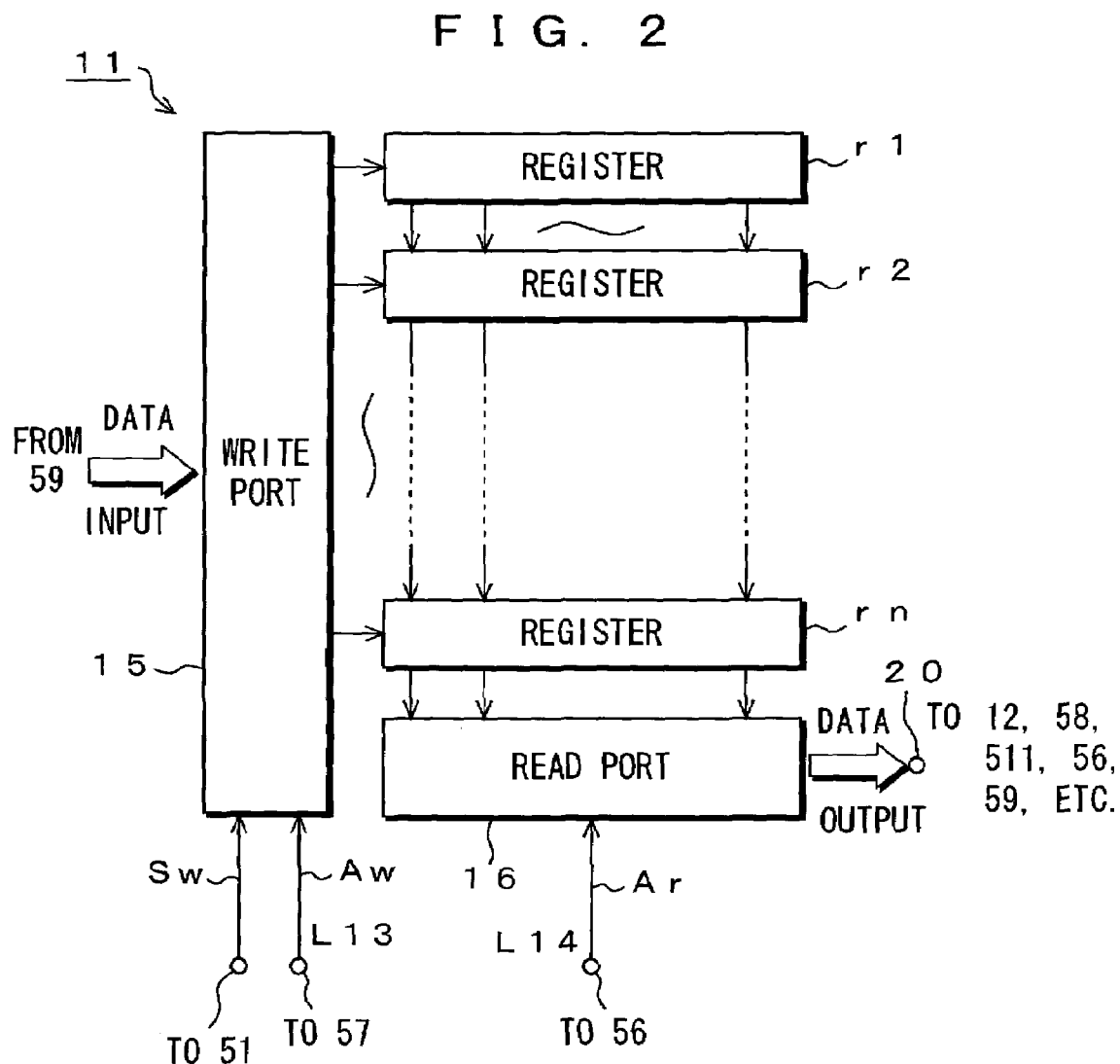

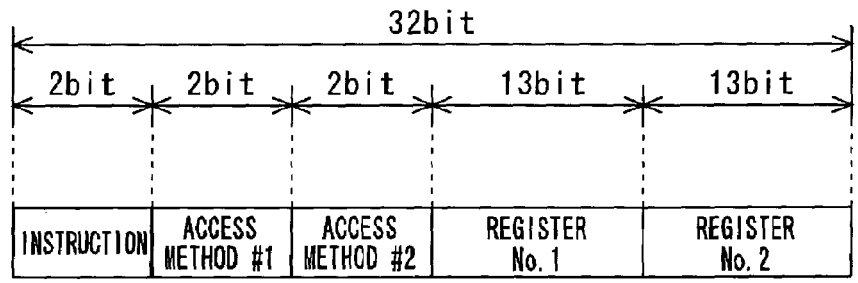
FIG. 3A
load, add, OR
cmp INSTRUCTION
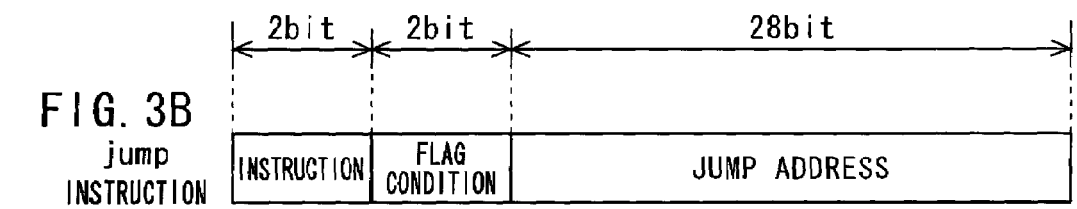
FIG. 3B
jump
INSTRUCTION
FIG. 3C
| INSTRUCTION | |
|---|---|
| 0 | load |
| 1 | add |
| 2 | cmp |
| 3 | jump |
FIG. 3D
| ACCESS METHOD | |
|---|---|
| 0 | REGISTER, DIRECTLY |
| 1 | REGISTER-TO-REGISTER |
| 2 | REGISTER-TO-OUTSIDE |
| 3 | NOT USED |
FIG. 3E
| FLAG CONDITION | |
|---|---|
| 0 | UNCONDITIONAL |
| 1 | zero flag |
| 2 | non-zero flag |
| 3 | NOT USED |

FIG. 4

| No. | EXPRESSION BY MNEMONICS | | EXPRESSION BY MACHINE LANGUAGE |
|---|---|---|---|
| #I 1 | LOOP: | add [r10], r11 | 5001400Bh |
| #I 2 | | add r10, r11 | 4001400Bh |
| #I 3 | | cmp r10, r12 | 8001400Ch |
| #I 4 | | jump nz, LOOP | E0000000h |

FIG. 5

| REGISTER No. | VALUE | |
|---|---|---|
| r 0 | 0 | |
| r 1 | 0 | |
| r 2 | 0 | |
| r 3 | 0 | |
| r 4 | 0 | |
| r 5 | 0 | |
| r 6 | 0 | |
| r 7 | 0 | |
| r 8 | 0 | |
| r 9 | 0 | |
| r 10 | 0 | ← No. OF CURRENT ARRAY |
| r 11 | 1 | ← VALUE TO BE ADDED |
| r 12 | 1 0 | ← END VALUE |

| WIRING INFORMATION ITEM | SIGNAL LINE | USE | WIRING INFORMATION ITEM | SIGNAL LINE | USE |
|---|---|---|---|---|---|
| D1 | NOT USED | | D21 | L21 | OPERATION RESULT VALUE Z |
| D2 | NOT USED | | D22 | L22 | COINCIDENCE DETECTION SIGNAL S22 |
| D3 | L3 | OPERATION PROGRAM AP | D23 | L23 | FLAG CONDITION SIGNAL S23 |
| D4 | L4 | INSTRUCTION CONTROL SIGNAL S4 | D24 | L24 | SELECTION CONTROL SIGNAL S24 |
| D5 | L5 | COUNT OUTPUT SIGNAL S5 | D25 | L25 | DATA, Z, X |
| D6 | L6 | SELECTOR OUTPUT S7, S27 | D26 | L26 | EXECUTION END SIGNAL S26 |
| D7 | L7 | INCREMENT OUTPUT SIGNAL S7 | D27 | L27 | BRANCH-OFF CONTROL SIGNAL S27 |
| D8 | NOT USED | | D28 | L28 | SELECTION CONTROL SIGNAL S28 |
| D9 | L9 | INSTRUCTION SIGNAL S9 | D29 | L29 | INSTRUCTION EXECUTION START SIGNAL S29 |
| D10 | L10 | EACH AUGMENT SIGNAL S10 | D30 | L30 | COUNT CONTROL SIGNAL S30 |
| D11 | L11 | DATA | D31 | L31 | SELECTION CONTROL SIGNAL S31 |
| D12 | L12 | WRITE CONTROL SIGNAL Sw | D32 | L32 | SELECTION CONTROL SIGNAL S32 |
| D13 | L13 | WRITE ADDRESS Aw | D33 | L33 | READ ADDRESS Ar |
| D14 | L14 | READ ADDRESS Ar | D34 | L34 | LATCH CONTROL SIGNAL S34 |
| D15 | L15 | EXTERNAL ADDRESS | D35 | L35 | ALU CONTROL SIGNAL S35 |
| D16 | L16 | EXTERNAL CONTROL SIGNAL S16 | D36 | L36 | X VALUE |
| D17 | L17 | LATCH CONTROL SIGNAL S17 | D37 | L37 | WRITE ADDRESS Aw |
| D18 | NOT USED | | D38 | L38 | LATCH CONTROL SIGNAL S38 |
| D19 | NOT USED | | ⋮ | | |
| D20 | L20 | DATA, X, Y | ⋮ | | |

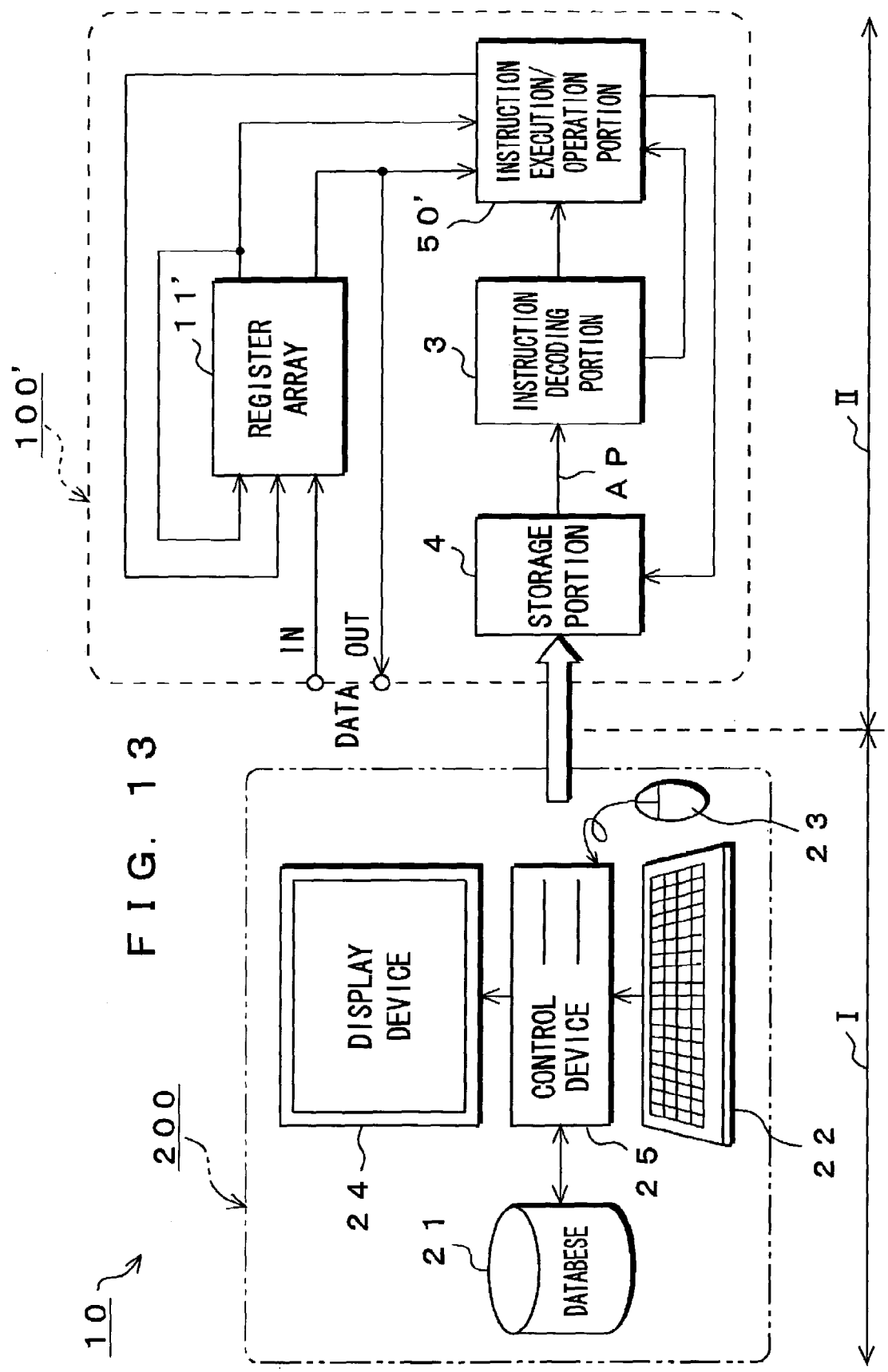

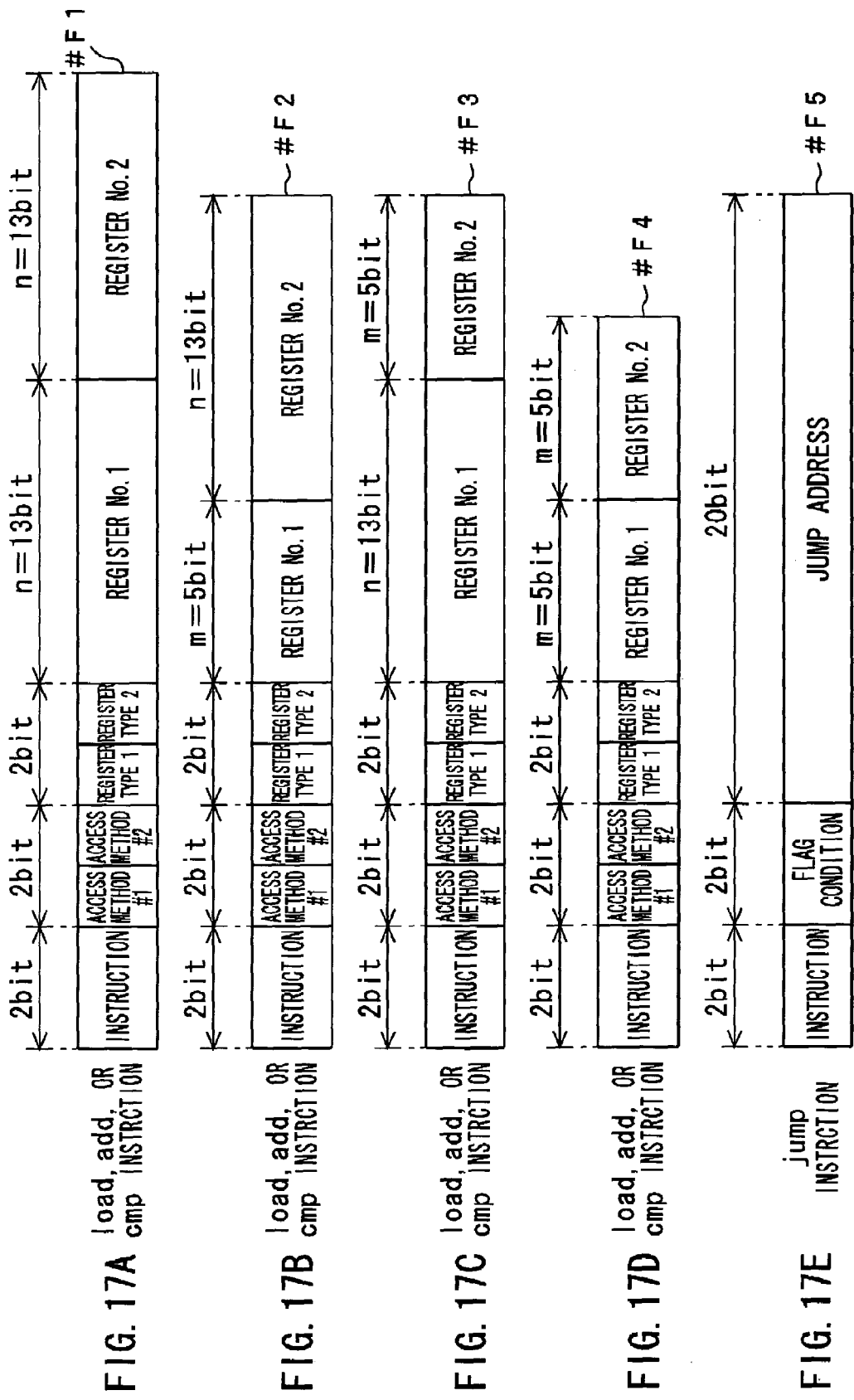

| INSTRUCTION ||
|---|---|
| 0 | load |
| 1 | add |
| 2 | cmp |
| 3 | jump |

FIG. 18A

| ACCESS METHOD #1, #2 ||
|---|---|
| 0 | REGISTER, DIRECTLY |
| 1 | REGISTER, RELATIVELY |

FIG. 18B

| REGISTER TYPE 1, 2 ||
|---|---|
| 0 | REGISTER No. OF 31 OR LOWER |
| 1 | REGISTER No. OF 32 OR HIGHER |

FIG. 18C

| FLAG CONDITION ||
|---|---|
| 0 | UNCONDITIONAL |
| 1 | zero flag |
| 2 | non-zero flag |
| 3 | NOT USED |

| PROGRAM WRITTEN IN C LANGUAGE | WRITTEN CONTENTS | EXECUTION EXAMPLE |
|---|---|---|
| int *read_add, *write_add, counter, end_val; | Global VARIABLE DECLARATION | ASSIGNED TO 32'ND AND HIGHER-NUMBERED REGISTERS |
| void main() | FUNCTION DECLARATION | |
| { | | |
|   int temp, added_val; | Local VARIABLE DECLARATION | ASSIGNED TO 31'ST AND LOWER-NUMBERED REGISTERS |
|   do { | | |
|     temp = *read_add; | SUBSTITUTION | |
|     temp = temp + added_val; | ADDITION | |
|     *write_add = temp; | SUBSTITUTION | |
|     read_add = read_add + added_val; | ADDITION | |
|     write_add = write_add + added_val; | ADDITION | |
|     counter = counter + added_val; | ADDITION | |
|   } while( counter != end_val ); | COMPARISON, BRANCH-OFF | |
| } | | |

| No. | EXPRESSION BY MNEMONICS | | EXPRESSION BY MACHINE LANGUAGE |
|---|---|---|---|
| #I1 | LOOP | load r0, (r32) | 140020h |
| #I2 | | add r0, r1 | 4001h |
| #I3 | | load (r33), r0 | 280420h |
| #I4 | | add r32, r1 | 480401h |
| #I5 | | add r33, r1 | 480421h |
| #I6 | | add r34, r1 | 480441h |
| #I7 | | cmp r34, r35 | 8C044023h |
| #I8 | | jump nz, LOOP | E00000h |

FIG. 23

| REGISTER No. | VALUE | |
|---|---|---|
| r0 | — | ← TEMPORARILY USED REGISTER |
| r1 | 1 | ← ADDED |
| ⋮ | ⋮ | |
| r32 | 0 | ← READ ADDRESS |
| r33 | 10 | ← WRITE ADDRESS |
| r34 | 0 | ← COUNTER |
| r35 | 10 | ← END VALUE |

FIG. 24
| ADDRESS | DATA |
|---------|------|
| 0000h | 0 |
| 0001h | 0 |
| 0002h | 0 |
| 0003h | 0 |
| 0004h | 0 |
| 0005h | 0 |
| 0006h | 0 |
| 0007h | 0 |
| 0008h | 0 |
| 0009h | 0 |
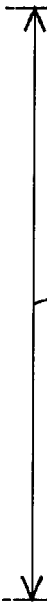
M1
| ADDRESS | DATA |
|---------|------|
| 000Ah | 0 |
| 000Bh | 0 |
| 000Ch | 0 |
| 000Dh | 0 |
| 000Eh | 0 |
| 000Fh | 0 |
| 0010h | 0 |
| 0011h | 0 |
| 0012h | 0 |
| 0013h | 0 |
M2

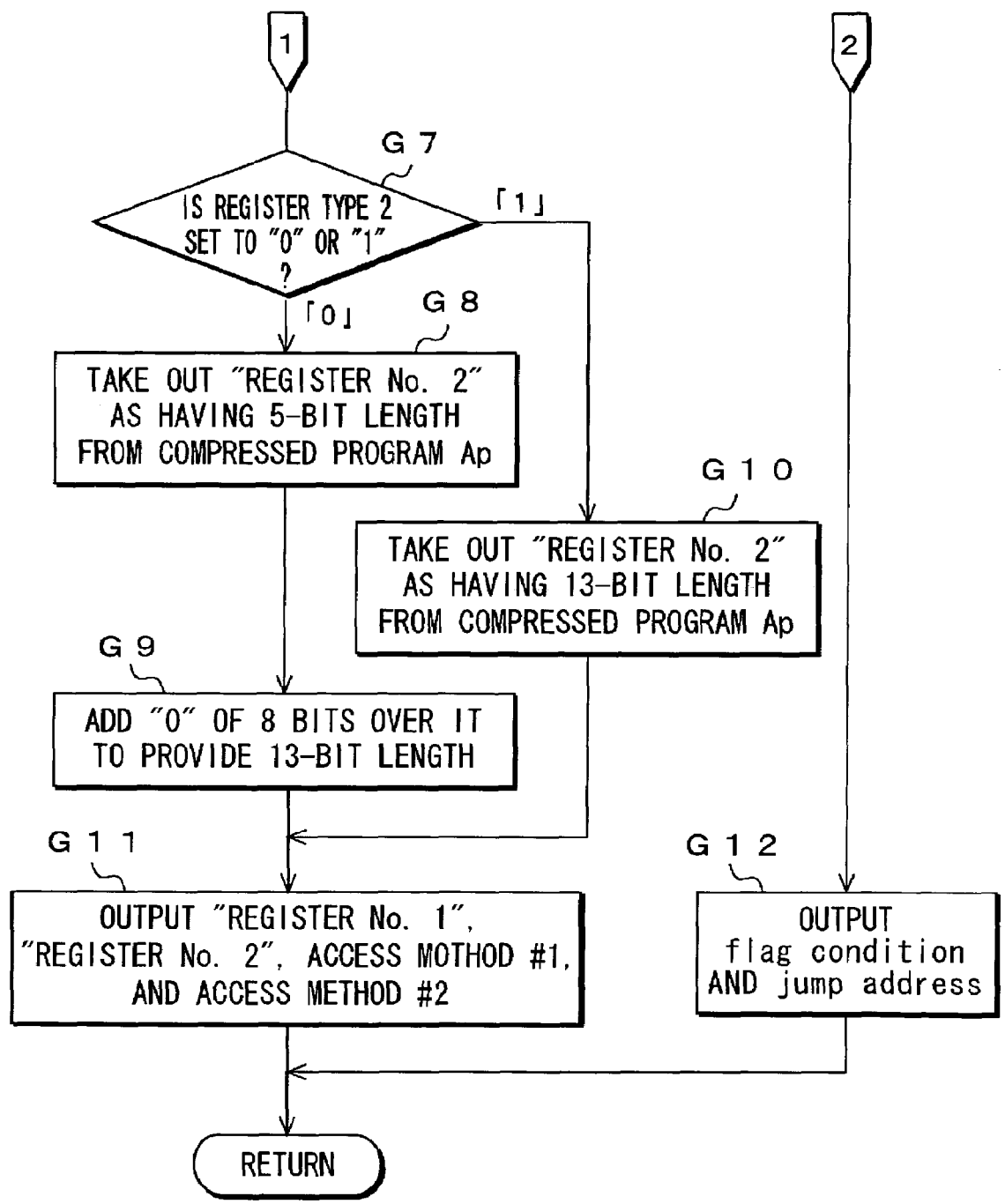

OPERATION PROCESSING DEVICE, SYSTEM AND METHOD HAVING REGISTER-TO-REGISTER ADDRESSING

TECHNICAL FIELD

The present invention relates to an operation-processing device, a method for constructing the same, and an operation-processing system and method that are well applicable to a central processing unit (CPU) and a microprocessor unit (MPU), which perform various types of data processing based on a system program, a programmable logic-operation device (PLD), a programmable one-chip microcomputer that can be incorporated in such a built-in electronic apparatus, and the like.

More specifically, it provides a register array for executing an operation instruction and an instruction execution controlling portion for controlling an operation portion to select one of the registers based on the operation instruction and perform register-to-register addressing processing that selects, based on a value held by this selected register, another register, thereby permitting the register array to operates like a memory that can read and write data at random and reducing an occupied area of a substrate as compared to the case of arranging a CPU, an RAM, a ROM, etc. on the substrate individually.

According to the present invention, there is provided an operation-processing device for performing an arbitrary operation by specifying plural registers, to decode a type of the register by obtaining a compressed program created by a program creation system and restore the number of bits of an instruction which specifies this register based on the register type in order to restore a program having an instruction structure with a predetermined instruction length, thereby reducing a capacity of a memory such as a ROM to store data of the program and reducing an occupation ratio of memory cells which function as a ROM in a case where a processor is constituted of a PLD comprised of the memory cells and logic operation element.

BACKGROUND ART

Recently, a microprocessor including a central processing unit (CPU) has been often used in various types of electronic apparatuses such as a portable terminal device, an e-card, and an information-processing device. In a case where this type of processor tries to access a storage device, a different access method is executed depending on whether the access destination is a register or an external memory. If the access destination is a register, for example, in a periphery of an arithmetic/logic unit (ALU), a copy register, a temporary register, etc. are arranged, so that to perform arithmetic processing, data is copied to the copy register or operated data is temporarily stored in the temporary register. This is because an ALU is suited for performing of register-to-register operation processing. If the access destination is an external memory, for example, in a case where information is written to an external memory address indicated by this external memory, the CPU outputs to this external memory a write address to specify the storage address and a write signal. To read information from an external memory address indicated by the register number, the CPU outputs to the external memory a read address to specify the storage address and a read signal.

In such a manner, to store information in an external memory address indicated by the register number or read it from the external memory address indicated by this register number, the CPU specifies a storage address (write address or read address) in this external memory. Such the processing is referred to as register-to-register addressing in many cases. This is because the external memory is typically mounted to a device different from the processor.

Further, this type of processor is mounted, besides an instruction execution/operation portion, with a read only memory (hereinafter referred to as ROM) for storing an instruction execution program, many registers used in instruction execution/operation processing, etc. With a conventional type microprocessor, in the case of incorporating this processor into an arbitrary electronic apparatus, an instruction and a behavior to be executed by the instruction correspond to each other in a one-to-one relationship. That is, the number of bits of an instruction used to specify a register, irrespective of whether it is used frequently or not, is made constant to often use a program created by using an instruction thus having a fixed length. Therefore, instruction with a fixed length is stored in a ROM and used.

On the other hand, with developments of semiconductor integrated-circuit technologies, a vast number of registers can be mounted in a processor (hereinafter referred to as "operation-processing device"). In this case, a correspondingly larger number of bits are required of an instruction which identifies a register. For example, in a case where 1024 registers are mounted, to identify one of the 1024 registers, the instruction needs to have 10 bits. However, with an actual program, not all of registers have the same access frequency, so that there are fluctuations in access frequency. The No. of a register accessed frequently is typically decided by a compiler.

With the conventional operation-processing device, a processing rate is decreased for the following reasons:

① It takes a certain lapse of time to access an external memory. Accordingly, the side of a processor must create an interface that matches a storage device to be accessed because typically the storage device is rarely made especially so as to match a specific processor. Therefore, each time the storage device is accessed, access goes through the interface, so that access time is increased to decrease an operation-processing speed;

② It takes a certain lapse of time to transfer data from an external memory to an ALU or vice versa. This is because an ALU typically accommodates register-to-register operation processing; in a case where there is data to be operated in the external memory, the data is once copied from the external memory to a copy register and then transferred from the copy register to the ALU so that it may undergo operation processing (register-to-memory addressing). It thus contributes to a decrease in operation-processing speed;

③ To integrate functions of a CPU, an RAM, a ROM, etc. into one chip so as to constitute one-chip microcomputer etc., a method for arranging the CPU and, in its periphery, the RAM, the ROM, etc. on the same semiconductor chip may be considered. This method relies on the register-to-memory addressing and so cannot be expected to improve the operation-processing speed;

④ Further, with the conventional operation-processing device, the following problems are involves in mounting of a ROM in which an instruction execution program is stored:

Looking at whole codes of this instruction execution program, there is a few case where, from, for example, ten bits of an instruction for specifying a register, the entire ten bits are used evenly. Therefore, there exist many useless bits in a memory (for example, ROM or flash memory) for storing the instruction execution program. Accordingly, a method of representing every register by using the same number of instruction bits prevents the ROM from being used efficiently;

⑤ Furthermore, to construct a microprocessor etc. with a programmable logic device (PLD) comprised of memory cells and logic operation elements, a method may be considered for arranging an instruction execution/operation portion and, in its periphery, a register array, a ROM, etc. on the same semiconductor chip. In this case, an increase in size of the instruction execution program owing to a demand for multi-functioning of the processor necessitates an increase in memory capacity of the ROM for storing this program. Therefore, the construct the ROM occupies the memory cells, so that it is difficult to allocate many of the memory cells to the register.

DISCLOSURE OF THE INVENTION

A first operation-processing device related to the present invention is a device for performing operation processing based on an arbitrary operation program. This operation-processing device comprises a register array having plural registers each for holding an arbitrary value based on a write address and a write control signal and outputting this value based on a read address, an operation portion for performing operation on a value read from this register array, an instruction-decoding portion for decoding an operation instruction from an operation program for operating this operation portion, and an instruction-execution-controlling portion for controlling the register array and the operation portion in order to execute an operation instruction decoded by this instruction-decoding portion. This instruction-execution-controlling portion selects one of the registers based on the operation instruction and, based on a value held by the selected register, performs register-to-register addressing processing for selecting another register.

According to this first operation-processing device, to perform operation processing based on an arbitrary operation program, the instruction-decoding portion decodes an operation instruction from the operation program for operating the operation portion. To execute the operation instruction decoded by the instruction-decoding portion, the instruction-execution-controlling portion controls the register array and the operation portion. On this assumption, the instruction-execution-controlling portion selects one of the registers based on the operation instruction and based on a value held by this selected register, performs register-to-register addressing processing for selecting another register. Each of the registers that constitute the register array holds an arbitrary value based on the write control signal and a write address specified by the register-to-register addressing processing and outputs this value based on a read address. The operation portion performs operations on the value read from the register array.

The register array can thus be used as if it is a data random access memory (RAM), so that it depends on register-to-memory addressing processing that specifies an external memory storage address less than a conventional central processing unit (CPU) does. Functions of an RAM and a ROM can be incorporated into the conventional CPU, so that it is possible to execute high-speed operation processing and reduce an area of a substrate occupied by the CPU, the RAM, the ROM, etc. as compared to a case where they are arranged individually on the substrate. An applied device to which this operation-processing device is applied can be compacted. Moreover, on the same semiconductor chip, the register array and the read only memory can be constituted of memory cells and the operation portion, the instruction-decoding portion, and the instruction-execution-controlling portion can be constituted of arithmetic/logic operation elements, thereby constituting this operation-processing device of a programmable logic device.

A constructing method of each operation-processing device related to the present invention is a method for constructing a device for performing operation processing based on an arbitrary operation program. This constructing method comprises the steps of forming plural memory cells and arithmetic/logic operation elements on the same semiconductor chip beforehand, combining the memory cells to define a register array and a read only memory and combining the arithmetic/logic operation elements to define an operation portion, an instruction-decoding portion, and an instruction-execution-controlling portion, and connecting the register array, the read only memory, the operation portion, the instruction-decoding portion, and the instruction-execution-controlling portion to each other based on preset wiring information and writing an arbitrary operation program to the read only memory.

According to the constructing method for constructing the operation-processing device related to the present invention, for example, upon power application, wiring information is read from a nonvolatile storage portion and, based on the wiring information, the register array, the read only memory, the operation portion, the instruction-decoding portion, and the instruction-execution control portion are connected to each other. Therefore, it is possible to construct such a programmable operation-processing device, upon power application, that the instruction-execution-controlling portion selects one of the registers based on an operation instruction and, based on a value held by this register, it performs register-to-register addressing for selecting another register. Moreover, it is possible to construct an operation-processing device that has incorporated functions of an RAM and a ROM into a conventional CPU, thereby executing high-speed operation processing and reducing an area of a substrate occupied by the CPU, the RAM, the ROM, etc. as compared to a case where they are arranged on the substrate individually. An applied device to which this operation-processing device is applied can be compacted.

A first operation-processing method related to the present invention is a method for performing arbitrary operation processing based on an operation program. This operation-processing method comprises the steps of beforehand preparing plural registers each for holding an arbitrary value based on a write address and a write control signal and outputting this value based on a read address, then decoding an operation instruction from the operation program, selecting one of the registers based on the operation instruction, performing register-to-register addressing processing for selecting, based on a value held by this selected register, another register, and performing operation on a value held by the selected another register and a value of the register selected by the register-to-register addressing processing.

According to this first operation-processing method, in a case where arbitrary operation processing is performed on the basis of the operation program, the plural registers can be handled as if they are a data random access memory, so that it depends on register-to-memory addressing processing less than a conventional operation-processing method that has combined the central processing unit and an external memory does. It is thus possible to perform high-speed operation processing. as compared with the conventional one.

A second operation-processing device related to the present invention is a device for performing operation processing based on an operation program for performing register-to-register addressing processing, comprising plural registers, a storage portion for storing a compressed program having a different instruction length in which the number of bits of an instruction for specifying the register is reduced beforehand based on a frequency at which the registers are used and a type of the register is written in an instruction structure of the program, an instruction-decoding portion for reading the compressed program from the storage portion to decode a register type and, based on this register type, restore the number of bits of the instruction for specifying the register; and an instruction execution/operation portion for performing an arbitrary operation by specifying the register based on the instruction having a predetermined length restored by the instruction-decoding portion.

According to this second operation-processing device, the number of bits of an instruction for specifying the register is reduced beforehand based on a frequency at which this register is used and, in the case of performing register-to-register addressing processing based on such compressed programs having different instruction lengths that a type of a register is described in an instruction structure of the programs, a compressed program used to specify this register from among the plurality of registers is stored in the storage portion. The instruction-decoding portion reads the compressed program from this storage portion to decode the register type and, based on this register type, restore the number of bits of the instruction for specifying this register. Based on this assumption, the instruction execution/operation portion specifies the register based on a program having a predetermined instruction length restored by the instruction-decoding portion to perform an arbitrary operation. Therefore, the compressed program has an instruction length which is varied in accordance with a frequency at which the registers are used, so that compressed program data such that a shooter length instruction is set to a frequently accessed register can be stored in the storage portion, thus reducing its memory capacity. It is thus possible to reduce a ratio of an area occupied by such memory cells as to function as a ROM so that the other memory cells may be allocated to the registers as many as possible in a case where the processor is constituted of a PLD comprised of the memory cells and logic operation elements.

A second operation-processing method related to the present invention is a method for performing operation processing based on an operation program for performing register-to-register addressing processing. This operation-processing method comprises the steps of storing a compressed program having a different instruction length in which the number of bits of an instruction for specifying the register is reduced beforehand based on a frequency at which said registers are used and a type of said register is written in an instruction structure of said program, reading this compressed program to decode a register type, based on this register type, restoring the number of bits of the instruction for specifying the register; and performing an arbitrary operation by specifying the register based on the restored instruction having a predetermined length.

According to this second operation-processing method, in a case where operation processing is performed on the basis of an operation program for performing register-to-register addressing processing, the compressed program has an instruction length which is varied in accordance with a frequency at which the register is used, so that compressed program data such that a shooter length instruction is set to a frequently accessed register can be stored in the storage portion, thus reducing its memory capacity. It is thus possible to reduce a ratio of an area occupied by such memory cells as to function as a ROM so that the other memory cells may be allocated to the registers as many as possible in a case where the processor is constituted of a PLD comprised of the memory cells and logic operation elements.

An operation-processing system related to the present invention is an operation-processing system comprises a program creation device for creating a program by editing an instruction for performing register-to-register addressing operations, based on a predetermined programming language on one hand, and an operation-processing device for performing the register-to-register addressing operation by using this program and plural registers on the other hand. This program creation device reduces the number of bits of an instruction for specifying the register based on a frequency at which this registers are used and writes a type of each of the registers in an instruction structure of this program, thereby creating a compressed program having a different instruction length. This operation-processing device obtains the compressed program created by the program creation device to decode the type of each of the registers and, based on this register type, restores the number of bits of the instruction for specifying the register, to specify the plural registers based on the instruction having a predetermined length, thereby performing arbitrary operations.

According to this operation-processing system, in the case of creating a program by editing the instruction to perform the register-to-register addressing operations based on a predetermined programming language on one hand and performing the register-to-register addressing operations by using this program and plural registers on the other hand, the program creation device reduces the number of bits of an instruction for specifying the registers based on a frequency at which this registers are used and writes a type of each of the registers in an instruction structure of this program, thereby creating the compressed program having a different instruction length. The operation-processing device obtains the compressed program created by the program creation device to decode the type of each of the registers and, based on this register type, restores the number of bits of the instruction for specifying the registers, to specify the plural registers based on the instruction having a predetermined length, thereby performing arbitrary operation. Therefore, a program creation system can vary the length of an instruction in accordance with a frequency at which a register is used, so that a shooter length instruction can be set to a frequently accessed register. With this, a program execution system can set the compressed instruction to a ROM etc., thereby reducing a memory capacity of the ROM etc. for storing program data. Further, in a case where the processor is constituted of a PLD comprised of memory cells and logic operation elements, it is possible to reduce an occupation ratio of memory cells which function as the ROM so that the other memory cells may be allocated to the registers as many as possible.

A third operation-processing method related to the present invention is an operation-processing method comprising the steps of creating, at a program creation system, a program by editing an instruction for performing register-to-register addressing operation based on a predetermined programming language, and performing, at a program execution system, the register-to-register addressing operation by using this program and plural registers. The program creation system reduces the number of bits of an instruction for specifying the register based on a frequency at which the registers are used and writes a type of each of the registers in an instruction structure of this program, thereby creating a compressed program having a different instruction length, while the program execution system obtains the compressed program created by the program creation system to decode the type of each of the registers and, based on this decoded register type, restores the number of bits of the instruction for specifying the register to specify the plural registers based on the instruction having a restored predetermined length, thereby performing arbitrary operation.

According to this third operation-processing method, in a case where the program creation system creates the program by editing the instruction to perform the register-to-register addressing operation based on a predetermined program language and the program execution system performs the register-to-register addressing operation by using this program and the plural registers, the program creation system can vary a length of the instruction in accordance with a frequency at which the registers are used, so that a shooter length instruction can be set to a frequently accessed register. Therefore, the program execution system can set the compressed instruction to a ROM etc., thereby reducing a memory capacity of the ROM etc. for storing program data. Further, in a case where the processor is constituted of a PLD comprised of memory cells and logic operation elements, it is possible to reduce an occupation ratio of memory cells which function as the ROM so that the other memory cells may be allocated to the registers as many as possible.

BRIEF DESCRIPTION OF THE DRAWINGS

FIG. 1 is a block diagram for showing a configuration of an operation-processing device 100 according to an embodiment of the present invention;

FIG. 2 is a block diagram for showing an internal configuration of a register array 11;

FIGS. 3A-3E are formats etc. for showing structure examples of instructions handled in the operation-processing device 100 in which FIG. 3A is a structure example of load, add, or amp instruction, FIG. 3B is a structure example of a jump instruction, FIG. 3C is a structure example of an instruction, FIG. 3D is an example of contents of an access method, and FIG. 3E is an example of contents of flag condition;

FIG. 4 is a table for showing examples of operation instructions executed by an operation program in a ROM cell 14;

FIG. 5 shows examples of conditions of registers, r0-r12 etc.;

FIG. 10 is a table for showing examples of wiring information stored in a flash memory 70;

FIG. 13 is a block diagram for showing a configuration of an operation-processing system 10 according to a third embodiment of the present invention;

FIGS. 17A-17E are formats etc. for showing structure examples of instructions handled in the microprocessor 101 in which FIG. 17A shows a structure example of load, add, and amp instructions relevant to 23 instruction pattern #F1, FIG. 17B shows a structure example of load, add, and cmp instructions relevant to instruction pattern #F2, FIG. 17C shows a structure example of load, add, and cmp instructions relevant to instruction pattern #F3, FIG. 17D shows a structure example of load, add, and amp instructions relevant to instruction pattern #F4, and FIG. 17E shows a structure example of a jump instruction relevant to instruction pattern #F5;

FIGS. 18A-18D are tables for showing examples of contents written in an instruction structure, in which FIG. 18A shows an example of an instruction structure, FIG. 18B shows an example of contents of access methods #1 and #2, FIG. 18C shows an example of contents of register types 1 and 2, and FIG. 18D shows an example of contents of a flag condition;

FIG. 19 is a table for showing an example of creating a program in a program creation system I;

FIG. 22 is a table for showing examples of operation instructions executed by a restored operation program;

FIG. 23 shows examples of conditions of registers r0, r1, r32, r33, r34, r35, etc;

FIG. 24 shows examples of storing data in an external memory 2;

FIGS. 26A and 26B are flowcharts for showing an example of processing in an instruction-bit restoring decoder 13.

BEST MODE FOR CARRYING OUT THE INVENTION

Figure 6:
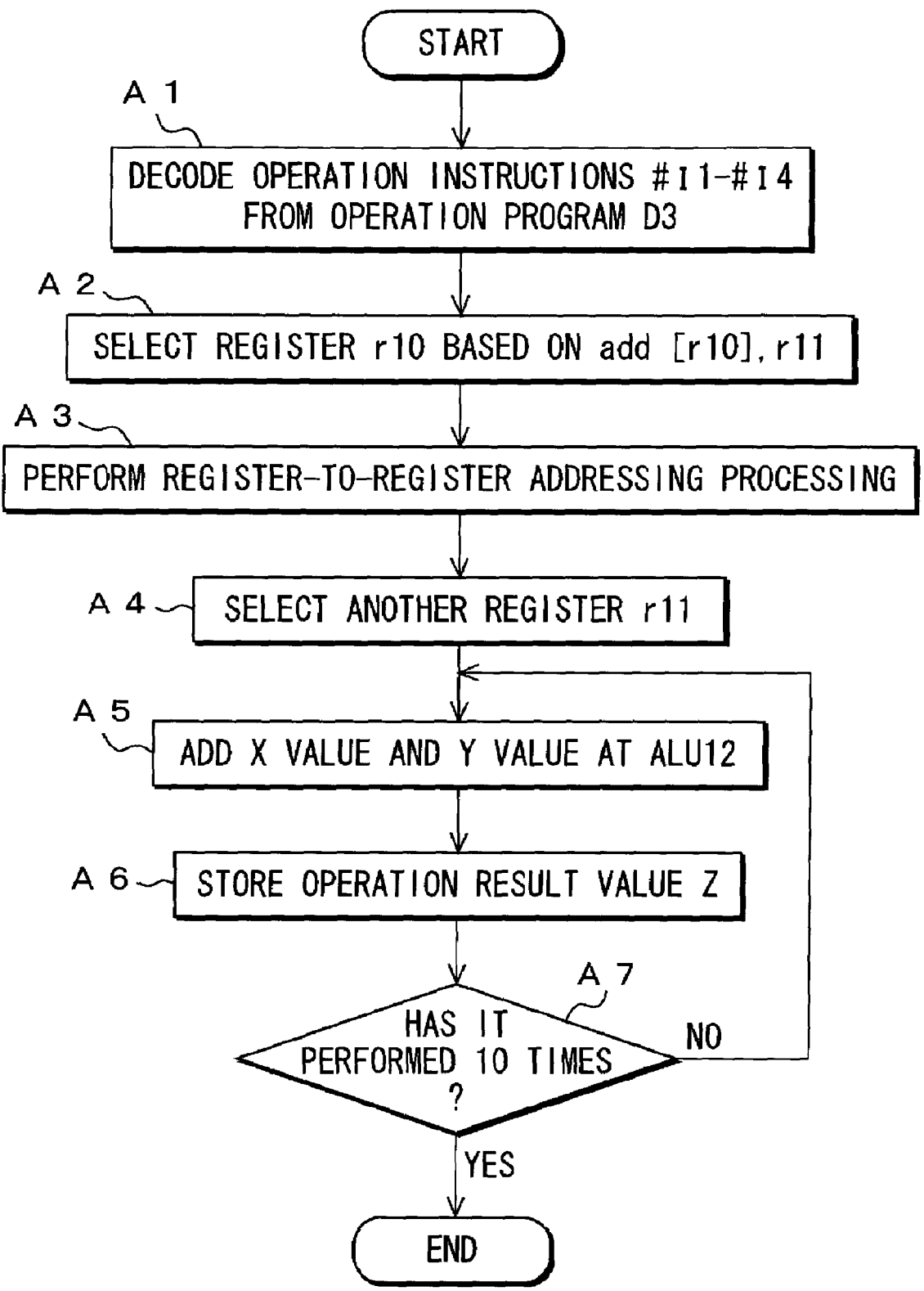
FIG. 6 is a flowchart for showing an operation example of the operation-processing device 100.

To solve the conventional problems, the present invention has been developed, and it is an object of the present invention to provide an operation-processing device, a method for constructing the same, and an operation-processing system and method that, in the case of integrating functions of a CPU, an RAM, a ROM, etc. into one chip, permit, allow an aggregate of registers to operate like a data random access memory and an area of a substrate occupied by these functional components to be reduced as compared to a case where they are arranged on the substrate individually.

It is another object of the present invention to provide an operation-processing device, a method for constructing the same, and an operation-processing system and method that make variable a length of an instruction in accordance with a frequency at which registers are used and enable a shooter length instruction to be set to a frequently accessed register, thereby reducing a memory capacity of a ROM etc. for storing program data.

ID The following will describe one embodiment of an operation-processing device, a method for constructing the same, and an operation-processing system and method that are related to the present invention, with reference to drawings.

(1) First Embodiment

FIG. 1 is a block diagram for showing a configuration of an operation-processing device 100 according to the first embodiment related to the present invention.

In this embodiment, it comprises a register array for executing operation instructions and an instruction execution control portion for controlling an operation portion, to perform register-to-register addressing processing for selecting one of registers based on an operation instruction and, based on a value held by this register, selecting another register, thereby permitting the register array to operate like a data random access memory (RAM) and an area of a substrate occupied by a CPU, an RAM, a ROM etc. to be reduced as compared to a case where they are arranged on the substrate individually.

The operation-processing device 100 shown in FIG. 1 is a processor well applied to a programmable one-chip microcomputer and performs operation processing based on an arbitrary operation program (first operation-processing device). In this embodiment, the operation-processing device 100 constitutes a programmable logic device, in which memory cells and arithmetic/logic operation elements formed on the same semiconductor chip are connected to each other based on wiring information, so that plural memory cells are used to constitute a register array 11 and a ROM cell 14 and plural arithmetic/logic operation elements are used to constitute an ALU12, a decoder 13, and an instruction execution control portion 50. The operation-processing device 100 is connected to an external system bus etc. through an interface 60.

The operation-processing device 100 has the register array 11. The register array 11 has plural registers, each of which holds an arbitrary value based on an address Aw and a write control signal Sw and outputs an augend X and, addend Y, etc. based on a read address Ar. The register array 11 is provided with registers as many as, for example, 8192 pieces×32 bits. To this register array 11, an arithmetic/logic unit (hereinafter abbreviated as ALU) 12, which is ones example of the operation portion, is connected through a data signal line L20, to perform operations on values of X, Y, etc. read from specified registers of the register array 11. A value of the operation result is Z. Operations may be addition, multiplication, subtraction, division, etc. These operations are set on the basis of an ALU control signal S35 output from the instruction execution control portion 50. To the data signal line L20, besides the ALU12, a latch circuits 58 and 511, selectors 56, 57, and 59, etc. are connected. The data signal line L20 transmits DATA, values of augend X and addend Y, etc.

This operation-processing device 100 is provided with an instruction-decoding portion (hereinafter referred to as decoder) 13 for operating the ALU12. To the decoder 13, a read only memory (ROM cell) 14 is connected, which stores an operation program AP necessary for the ALU12 to perform operations as machine-language instructions. The ROM cell 14 outputs the operation program AP based on a count output signal S5 from a program counter 54. The ROM cell 14 is also mounted in the processor.

The decoder 13 decodes operation instructions from an operation program AP prepared beforehand. For example, it decodes a machine-language instruction read from the ROM cell 14, to generate an instruction control signal S4, an instruction signal S9, and each augment signal S10. The instruction signal S9 contains a load instruction, an add instruction, a cmp instruction, and a jump instruction. Each augment signal S10 contains access method #1, access method #2, register numbers r0, r1, . . . , a flag condition, a jump address, etc. The instruction control signal S4 is output to an instruction read state machine 52. This operation program AP has operation instructions for performing register-to-register addressing processing. The register-to-register addressing processing refers to selecting one of the registers based on an operation instruction and, based on a value held in this selected register, selecting another register. This processing is performed by access method #1.

To the decoder 13, the instruction-execution-controlling portion 50 is connected, so that it controls the register array 11 and the ALU12 to execute operation instructions decoded by the decoder 13. The instruction-execution-controlling portion 50 has an execution state machine 51, the instruction read state machine 52, a selector 53, the program counter (PC) 54, a plus-1 incrementer 55, the first selector 56, the second selector 57, the inputting selector 59, and the latches 58, 510, and 511, to perform the register-to-register addressing processing. The instruction read state machine 52 controls the program counter 54 and the execution state machine 51 based on the instruction control signal S4 output from the decoder 13. For example, this machine 52 outputs an instruction execution start signal S29 to the execution state machine 51, to which the decoder 13 outputs the instruction signal S9 and each augment signal S10.

To the execution state machine 51, the ALU12, the selectors 56, 57, and 59, and the latch circuits 58, 510, and 511 are connected. An output of the selector 56 is connected via a read address line L14 to the register array 11 and an output of it is connected to each of the data signal line L20 and an address signal line L33. This connection is provided in order to select either a read address Ar or a read execution address Ar. An output of the selector 57 is connected via an address line L13 to the register array 1.1 and an input thereof is connected to each of the data signal line L20 and an address signal line L34. This connection is provided in order to select either a write address Aw or a write execution address Aw. This machine 51 starts execution of an instruction based on the instruction execution start signal S29. For example, to write data, the write control signal Sw is output to the register array 11 and a selection control signal S24 is output to the selector 59. To read data, a selection control signal S32 and a read address Ar are output to the selector 56. To perform an operation, a latch control signal S34 is output to the latch circuit 58 and a latch control signal S38 is output to the latch circuit 510. To an outside of this processor, an external control signal S16 is output. When execution of an instruction is finished, the execution state machine 51 outputs an execution end signal S26 to the instruction read state machine 52, to increment a value of the program counter 54.

To these execution state machine 51 and instruction read state machine 52, the selector 53 is connected to select either an increment output signal S7 or a branch-off control signal S27 based on a selection control signal S28 and output it as a selector output to the program counter 54. The selection control signal S28 is supplied from the execution state machine 51. The increment output signal S7 is output from the incrementer 55 to the selector 53. The program counter 54, based on a count control signal S30, specifies a location to which an operation program AP is read from the ROM cell 14. The plus-1 incrementer 55 increments the count output signal S5 of the program counter 54 by one (+1). The count control signal.S30 is supplied from the instruction decode state machine 52.

In this embodiment, the selector 56 connected to the execution state machine 51 selects any one of a read execution address Ar to select one of the registers and a read address Ar to select this register again. The selector 56 selects any one of these addresses based on the selection control signal S32 from the execution state machine 51. The read execution address Ar is output from the execution state machine 51 to the selector 57. The read address Ar is output from the register array 11. Besides the selector 56, the selector 57 is connected to the execution state machine 51, to select any one of the write execution address Aw to select one of the registers and the write address Aw to select this register again. The selector 57 selects any one of these addresses based on a selection control signal S31 from the execution state machine 51. The write execution address Aw is output from the execution state machine 51 to the selector 57. The write address Aw is output from the register array 11.

The selector 59 is connected to a data bus 19A, the register array 11, and the ALU12, to input any one of data (DATA) taken in from the data bus 19A, a value of an augend X (addend Y) output from the register array 11, and a value of an operation result Z output from the ALU12 based on the selection control signal S24. The latch circuit 58 is connected between a read port of the register array 11 and the ALU12, to latch an output value X of a register ri based on the latch control signal S34. The latch circuit 510 is connected to a comparison output portion etc. of the ALU12, to latch a coincidence detect signal S22 based on the latch control signal S38, thereby outputting a flag condition signal S23. The latch circuit 511 is connected between the read port of the register array 11 and an address bus 19B, to latch an external address based on the latch control signal S17.

Note here that if a jump (instruction branch-off) operation is generated owing to an executed instruction, the branch-off control signal S27 that indicates a jump destination address is output from the execution stat machine 51 to the selector 53. The selector 53 selects this branch-off control signal S27 based on the selection control signal S28, to write this branch-off control signal S27 to the program counter 54. Further, to the execution state machine 51, a control bus 19C is connected, to output the external control signal S16 to the outside. This is done so in order to control an external peripheral apparatus.

FIG. 2 is a block diagram for showing an internal configuration of the register array 11. The register array 11 shown in FIG. 2 provides 8192 32-bit registers, r0-rn (i=0-n; 8191), to an input of each of which registers, r0-rn a write port 15 is connected. A one-bit register is constituted of a D-type flip-flop circuit etc. The write port 15 is connected to the selector 59 shown in FIG. 1, to write, based on the control signal Sw and the write address Aw, any one of data (DATA) taken in from the data bus 19A, a value of an augend X (addend Y) output from the register array 11, and a value of an operation result Z output from the ALU12 to the registers, ro-rn. The write port 15 is connected via the address line L13 to the selector 57 shown in FIG. 1. This is done so in order to supply the write execution address Aw or the write address Aw.

To an output of each of the registers, r0-rn, a read port 16 is connected. The read port 16 is connected through the data signal line L20 to the ALU12, the latch circuits 58 and 511, the selectors 56, 57, and 59, etc. shown in FIG. 1, to read data (DATA) from a register, ri specified on the basis of the read address Ar. The read port 16 is connected via the address line L14 to the selector 56 shown in FIG. 1. This is done so in order to supply the read execution address Ar or the read address Ar. The write port 15 is connected via the address line L13 to the selector 57 shown in FIG. 1. This is done so in order to supply the write execution address Aw or the write address Aw.

The following will describe formats etc. for showing examples of a structure of instructions handled by the operation-processing device 100. According to a format shown in FIG. 3A, an instruction has a fixed length of 32 bits and handled as roughly classified into a load instruction, an add instruction, a amp instruction or the lie, and a jump instruction. In each of the load, add, and cmp instructions, starting two bits indicate a type of an instruction. The instruction is classified into four types as shown in FIG. 3C. In FIG. 3C, the instruction may be a transfer instruction with code "0" that indicates load, an addition instruction with code "1" that indicates add, or a comparison instruction with code "2" that indicates comp. Code "3" indicates jump, that is, a branch-off instruction. As for the cmp instruction, if a comparison result indicates they are equal to each other, a zero flag is set to 1 based on the flag condition signal S23 of the latch circuit 510 shown in FIG. 1 and, otherwise, set to 0.

Two bits that follow the instruction shown in FIG. 3A describe access method #1 and are followed by two bits that describe access method #2. In an operand, the left side indicates access method #1 represented by register No. 1 and the right side indicates access method #2 represented by register No. 2. That is, the access method #1 indicates a method for accessing a register r1 indicated by register No. 1 and the access method #2 indicates a method for accessing a register r1 indicated by register No. 2. The access methods #1 and #2 correspond to register Nos. 1 and 2 respectively, and the processing is performed therebetween.

For each of them, four access methods are prepared as shown in FIG. 3D. In FIG. 3D, code "0" means "register, directly", indicating that a value of a register, r1 indicated by a register No. can be used directly. Code "1" means "register-to-register", indicating that a value of a register indicated by a register No. is interpreted as the register No. again, to use a value of a register indicated by this register No. Code "2" means "register-to-outside", indicating that a value of a register indicated by a register No. is handled as an external address, to place access to the outside of the operation-processing device 100. Code "3" is not used. Access methods #1 and #2 correspond to register Nos. 1 and 2 respectively, and the processing is performed therebetween. For example, register No. 1 indicates a register, r1 that holds an augend and register No. 2 indicates a register, r1 that holds an addend.

Further, in a jump instruction format shown in FIG. 3B, starting two bits describe an instruction, followed by two bits that describe a flag condition. The following 28 bits describe a jump address. The flag condition indicates a condition for deciding whether instruction execution control is shifted, as shown in FIG. 3E. Code "0" means "unconditional" indicating that the control is always shifted. Code "1" means "zero flag" indicating that the control is shifted where the zero flag is "1". Code "2" means "non-zero flag" indicating that the control is shifted where the zero flag is "0". Code "3" is not used.

FIG. 4 is a table for showing examples of operation instructions AP executed by an operation program in the ROM cell 14. FIG. 5 shows examples of conditions of registers, r0-r12 etc. In this embodiment, such a case is assumed that any one of 13 registers, ri (i=0-12) of the register array 11 is used to add "1" to a value stored in that register, ri and an operation result is stored into an arbitrary register indicated by the value of that register r1. Operation instructions #I1 through #I4 shown in FIG. 4 are described in the operation program AP in the ROM cell 14.

Each of the operation instructions #I1 through #I4 indicates an expression by mnemonics, an expression by a machine language, and processing contents. Operation instruction #I1 shown in FIG. 4 is, in an instruction structure shown in FIG. 3A, add [r10], r11 represented by 5001400Bh in the machine language and has such contents that to a value of register, r10 of a register number indicated by r10 of the register array 11, a value of register r11 of a register number indicated by r11 is added and a result thereof is stored in the register r10 of the register number indicated by r10.

Operation instruction #I2 is add r10, r11 represented by 4001400Bh in the machine language and has such contents that to a value of register r10, a value of register r11 is added and this operation result is written back to register r10. Operation instruction #I3 is cmp r10, r12 represented by 8001400Ch in the machine language and has such contents that a value of the register, r10 and a value of the register, r12 are compared to each other and if they are equal to each other, the zero flag is set to "1" and, otherwise, set to "0". Instruction #I4 is jump nz, LOOP represented by E000000Oh in the machine language and has such contents that control is shifted to a label indicated by LOOP where the zero flag is set to "1".

According to examples of conditions of the 13 registers of the register array 11 shown in FIG. 5, the registers, r0 through r10 all have an initial value of "0", the register, r11 has an initial value of "1", and the register, r12 has an initial value of "10". When the instruction #I1 shown in FIG. 4 is executed, a value of register, r10 shown in FIG. 5 is "0", so that the register, r0 is selected. A value of that register, r0, that is, "0" is read to the read port 16; subsequently, a value of the register, r11, that is, "1" is read to the read port 16, so that these values are added up and the operation result thereof, that is, "1" is stored in the register, r0. The value of the register, r0 is thus increased by "1" each time. In this embodiment, the addition processing is repeated 10 times, which value is given by the register, r12.

When the instruction #I2 shown in FIG. 4 is executed, to "0" which is a value of the register, r10 shown in FIG. 5, "1" which is a value of the register, r11 is added and the operation result thereof, "1" is stored in the register, r10. With this, process shifts to the next register. When the instruction #I3 shown in FIG. 4 is executed, a value of the zero flag is held by the latch circuit 510, to be referenced by the subsequent instructions. Based on this assumption, a value "0" of the register, r10 and a value "10" of the register, r12 are compared to each other.

In this embodiment, the value "0" of the register, r10 and the value "10" of the register, r12 are not equal to each other, so that "0" is set to the zero flag. If the value "10" of the register, r10 and the value "10" of the register, 12 agree with each other, "1" is set to the zero flag. When the instruction #I4 shown in FIG. 4 is executed, the zero flag has "0", so that control is shifted to the instruction #I1 (LOOP). When this operation is repeated 10 times, the value of the register, r10 becomes "10" and the value "10" of the register, r10 agrees with the value "10" of the register, r12, so that the zero flag is set to "1" by the instruction #I3 and control is not shifted to the instruction #I1 from the instruction #I4, thus ending the operation processing.

The following will describe an example of operations of this operation-processing device 100 about a first operation-processing method related to the present invention. FIG. 6 is a flowchart for showing an operation example of the operation-processing device 100.

In this embodiment, such a case is assumed that addition processing is performed on the basis of an operation program AP that forms the operation instructions #I1-#I4 shown in FIG. 4. Of course, such a case is also assumed that in the operation-processing device 100, such a register array 11 is prepared beforehand as to hold an arbitrary value based on a write address Aw and the write control signal Sw and output this value based on a read address Ar. As for a register condition of the register array 11, as shown in FIG. 5, for example, of the 13 registers, the registers, r0-r10 all have an initial value of "0", the register, r11 has an initial value of "1", and the register, r12 has an initial value of "10". When these initial values are written, the execution state machine 51 outputs a write address Aw to the address signal line L34 and the selector 57 selects registers, r10, r11, and r12 based on the selection control signal S31, to set their initial values "0", "1", and "10" respectively.

Under these operating conditions, at step A1 of the flowchart shown in FIG. 6, first the decoder 13 receives the operation program (machine language instructions) AP from the ROM cell 14 and decodes the operation program AP to detect the operation instructions #I1 through #I4. In this case, the decoder 13 detects the operation instruction #I1 related to add [r10], r11 indicated by 5001400Bh in the machine language described with FIG. 4, the operation instruction #I2 related to add r10, r11 indicated by 4001400Bh in the machine language, the operation instruction #I3 related to amp r10, r12 indicated by 8001400Ch in the machine language, and the operation instruction #I4 related to jump nz, LOOP indicated by E000000Oh in the machine language, from which operation instructions #I1-#I4 the instruction control signal S4, the instruction signal S9, and each augment signal S10 are generated, of which the signals S9 and S10 are output to the execution state machine 51. The instruction signal S9 contains load, add, amp, and jump instructions. Each augment signal S10 contains access method #1, access method #2, registers, r0, r1, ..., a flag condition, a jump address, etc. The instruction control signal S4 is output from the decoder 13 to the instruction read state machine 52.

Then, at step A2, the execution state machine 51, when having 2Z received operation instruction #I1 under the control of the instruction read state machine 52 in terms of instruction reading, selects one register, r10 based on add [r10], r11 indicated by 5001400Bh. In this case, the process outputs register No. "10" to the address signal line L33. The selector 56 selects the address signal line L33 using the selection control signal S32. In such a manner, register No. "10" is output to the read address line L14. This value "10" is used by the register array 11 as an address Ar to read the register, r10 having register No. 10. The register, r10 is selected in the register array 11.

The register r10 has a value of "0".

At step A3, the process performs register-to-register addressing processing based on value "0" held in the register, r10. In this case, value "0" of the register, r10 is output from the read port 16 to the data signal line L20. This is done so in order to select another register, r0. In such a manner, value "0" of the register, r0 output from the register array 11 to the data signal line L20 is held in the latch circuit 58. Along with this, the execution state machine 51 selects the data signal line L20 based on the selection control signal S32. With this, the selector 56 outputs value "0" of the register, r10 to the read address line L14. In the register array 11, the register, r0 is selected.

Then, the process shifts to step A4, where it selects another register r11 based on the operation instruction #I1. In this case, the execution state machine 51 outputs the selection control signal S32 to the selector 56 so that the selector 56 may select a read execution address Ar. Along with this, it outputs value "11" as a read execution address Ar to the address signal line L33. This value "11" is used as an address to read the register, r11 of register No. "11" in the register array 11. A value of the register, r11 is "1". Accordingly, the register, r11 is selected on the basis of the read address Ar. This selection causes Y value="1", which is an output value of the register, r11 from the read port 16 to the data signal line L20, to output. By these operations, Y value="1" of the register, r11 output to the data signal line L20 and X value="0", which is an output of the latch circuit 58, are input to the ALU12. That is, X value="0" of the register, r0 specified by value "0" held in the register, r10 (value of the register, r0 selected by the register-to-register addressing processing) and Y value="1" of the register, r11 are input to the ALU12.

Then, at step A5, the ALU12 adds up Y value="1" held in the register, r11 and X value="0" of the register, r0 selected by the register-to-register addressing processing. In this case, the operation instruction signal S35 that indicates an addition instruction has been input to the ALU12. Accordingly, the ALU12 adds Y value="1" to X="0" and outputs an operation result value Z="1" to the selector 59 as the operation result signal S21.

At step A6, an operation result value Z is selected by the selector 59 based on the operation instruction #I2 represented by 4001400Bh in the machine language. In this case, the selector 59 is set to select the operation result value Z by using the selection control signal S24. The operation result value Z is input to the register array 11. The register array 11, based on the write address Aw and the write control signal Sw, stores the operation result value Z in the register, r0 specified by the register-to-register addressing processing. That is, to write back an operation result value Z of the ALU12 to the register, r0 specified by the register, r10, first the execution state machine 51 outputs value "10" as a write execution address Aw to the address signal line L33. In this case, to the reading selector 56, the selection control signal S32 is output to select the address signal line L33.

Then, value "0" of the register, r10 is output to the read port 16 of the register array 11, so that the selection control signal S31 is output to the writing selector 57 to select the data signal line 20. By this selection, value "0" to select the register, r0 is input from the read port 16 of the register array 11 through the selector 57 to the register array 11 as a write address Aw. With this, the write address Aw and write contents have been input to the register array 11. Then, the execution state machine 51 uses the write signal SW to instruct actual writing of a value. It is thus possible to perform an operation of add [r10], r11 of the operation instruction #I1.

In this example, at step A7, the process decides whether the processing is repeated as many times as a value (=10) indicated by the register, r12. In this decision, a value of the zero flag held in the latch circuit 510 is referenced on the basis of the operation instruction #I3. The value of the zero flag and value "10" of the register, r12 are compared to each other, so that if they do not agree, "0" is set to the zero flag. If they agree, "1" is set to the zero flag. Therefore, if the processing is yet to be repeated as many times as the value (=10) indicated by the register, r12, "0" is set to the zero flag, so that the process returns (loops) to step A5 based on the operation instruction #I4, to read value "1" of the register, r11 to the read port 16. This value "1" undergoes addition processing repeatedly to increase the value of the register, r0 by "1" each time, so that operations results "1", "2", "3", . . . are stored in the register, r0. It is thus possible to store an operation result value Z in the register, r0 based on the write address Aw and the write control signal Sw. If, at step A7, the processing is repeated as many times as the value (=10) indicated by the register, r12, value "10" of the register, r10 and value "10" of the register, 12 agree, so that the zero flag is set to "1" in accordance with the instruction #I3 and control is not shifted to the instruction #I1 from the instruction 14, thus ending the operation processing without looping to step A5.

As described above, according to the operation-processing device and method of the first embodiment related to the present invention, the operation instructions #I1-#I4 etc. decoded by the decoder 13 at step A1 of the flowchart shown in FIG. 6 are output as the instruction signal S9 and each augment signal S10 to the execution state machine 51. The execution state machine 51, at step A2, selects one register, r10 based on the operation instructions #I1-#I4 and, at step A3, performs the register-to-register addressing processing based on value "0" held in the register, r10. Further, at step A4, when another register, r0 is selected, at step A5 an X value and a Y value are added up by the ALU12, the register, r0 of the register array 11 holds an operation result value Z based on a write address specified by the register-to-register addressing processing and the write control signal Sw, and at step A5, this operation result value Z is output as the next addend X value based on the read address Ar. The ALU12 adds up the X value and the Y value read from the register array 11.

Thus, the register array 11 can be handled as a data random access memory (RAM), thereby placing access to the register array 11 (registers) as handling the registers, r0-r12 etc. as an RAM (memory) of an ordinary processor. This eliminates a necessity of depending on register-to-memory addressing processing that specifies an external memory storage address in contrast to a conventional type central processing unit (CPU). It is possible to incorporate an RAM and a ROM into the conventional type CPU, thereby executing high-speed operation processing and reducing an area of a substrate occupied by the CPU, the RAM, the ROM, etc. as compared to a case where they are arranged individually on the substrate. An applied device to which this operation-processing device 100 is applied can be compacted.

(2) Second Embodiment

Figure 7:
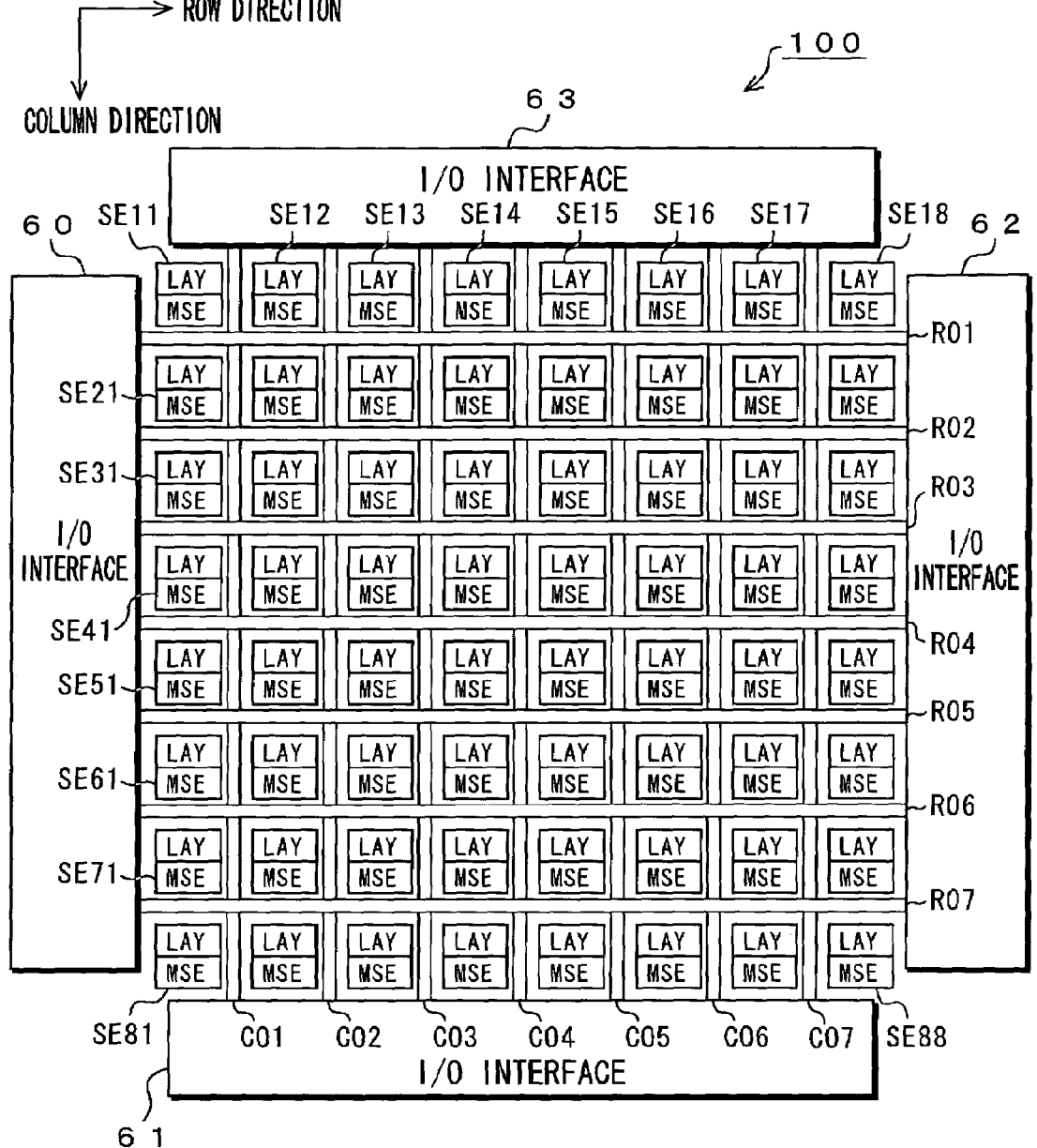
FIG. 7 is a plan view a semiconductor chip for showing a constructing example of the operation-processing device 100 according to a second embodiment of the present invention.

FIG. 7 is a plan view of a semiconductor chip indicative of an example of constructing an operation-processing device 100 according to the second embodiment related to the present invention.

In this embodiment, in a case where the operation-processing device 100 shown in FIG. 1 is constructed, beforehand plural memory cells and arithmetic/logic operation elements are formed on the same semiconductor chip, so that these memory cells are combined to define a register array 11 and a ROM cell 14 and the arithmetic/logic operation elements are also combined to define an ALU12, a decoder 13, and an instruction-execution-controlling portion 50. Then, the register array 11, the ROM cell 24, the ALU12, the decoder 13, and the instruction-execution-controlling portion 50 are connected to each other based on preset wiring information and the above-mentioned operation program AP is written to the ROM cell 14.

The operation-processing device 100 shown in FIG. 7 is a programmable semiconductor device (programmable logic device: PLD) in which plural memory cells MSE and arithmetic/logic operation elements LAY are formed on the same semiconductor chip beforehand. In a column direction of this semiconductor device, wiring patterns (hereinafter referred to as column wiring lines CO1-CO7) as many as, for example, N=7 (i=1, 2, i, . . . , N) are arranged. In a row direction, similarly, wiring patterns (hereinafter referred to as row wiring lines RO1-RO7) are arranged. These column wiring lines CO1-C07 and row wiring lines R01-RO7 are oriented to be orthogonal to each other, thereby providing a matrix shape of the PLD. At each intersection in the matrix, a memory cell/arithmetic/logic operation element block SEij (i=1-8, j=1-8) (hereinafter referred to as cell block simply) having one unit of the plural memory cells MSE and arithmetic/logic operation elements LAY is provided.

In this embodiment, 64 (=8×8) cell blocks SE11-SE88 are formed on the same semiconductor chip. In an upper half of one cell block SEij, plurality memory cells MSE are arranged, and in a lower half thereof, plural arithmetic/logic operation elements LAY are arranged. Further, it is assumed that the register array 11 and the ROM cell 14 are defined either by combining the memory cells in a cell block SEij or by combining them as well as the memory cells of another cell block SEij.

On both end sides of the column wiring lines CO1-CO7 and on both end sides of the row wiring lines RO1-RO7, I/O interfaces 60-63 are provided respectively in such a manner that to the I/O interface 61 the side of one end of each of the column wiring lines CO1-CO7 is connected, and to the side of the other end the I/O interface 63 is connected. To the I/O interface 60, the side of one end of each of the row wiring lines RO1-RO7 is connected, and to the side of the other end, the I/O interface 62 is connected. It is possible to program the wiring lines to the I/O interface 60 or 63 by using the column wiring line CO1 or the row wiring line RO1 which is the nearest the cell block SE11. Of course, the other column wiring lines CO2-CO7 or row wiring lines RO2-RO8 etc. can be used to program the wiring lines to another cell block SEijl.

The four I/O interfaces 60-63 are arranged to go along and surround the outer-periphery composing cell blocks SE11, SE12, . . . , SE18; SE11, SE21, . . . , SE81; SE81, SE82, . . . , SE88; and SE18, SE28, . . . , SE88 in the 64 matrix cell blocks SEij. Everywhere between the I/O interfaces and the Inter-memory-cell wiring lines and the inter-arithmetic/logic-operation-element wiring lines in each cell block SEij, the wiring lines between the cell blocks SE11-SE88, and the row wiring lines RO1-RO7 to provide wiring between these, plural switch elements (transistors) are arranged so that the circuit elements can be connected to each other arbitrarily by turning these switch elements ON based on the wiring information.

Note here that at this stage, none of the register array 11, the ALU12, the decoder 13, the ROM cell 14, the instruction-execution-controlling portion 50, etc. is not defined yet, so that the programmable logic device has a versatility. In this embodiment, in a case where the programmable logic device is incorporated as a CPU into an electronic apparatus, the cell blocks SE11-SE88 are allocated to each of the functional circuits and connected to each other by using the row wiring lines RO1-RO7, the column wiring lines CO1-CO7, etc. so that operation functions required in this electronic apparatus can be programmed arbitrarily to realize CPU functions etc. that match user requirements.

Figure 8:
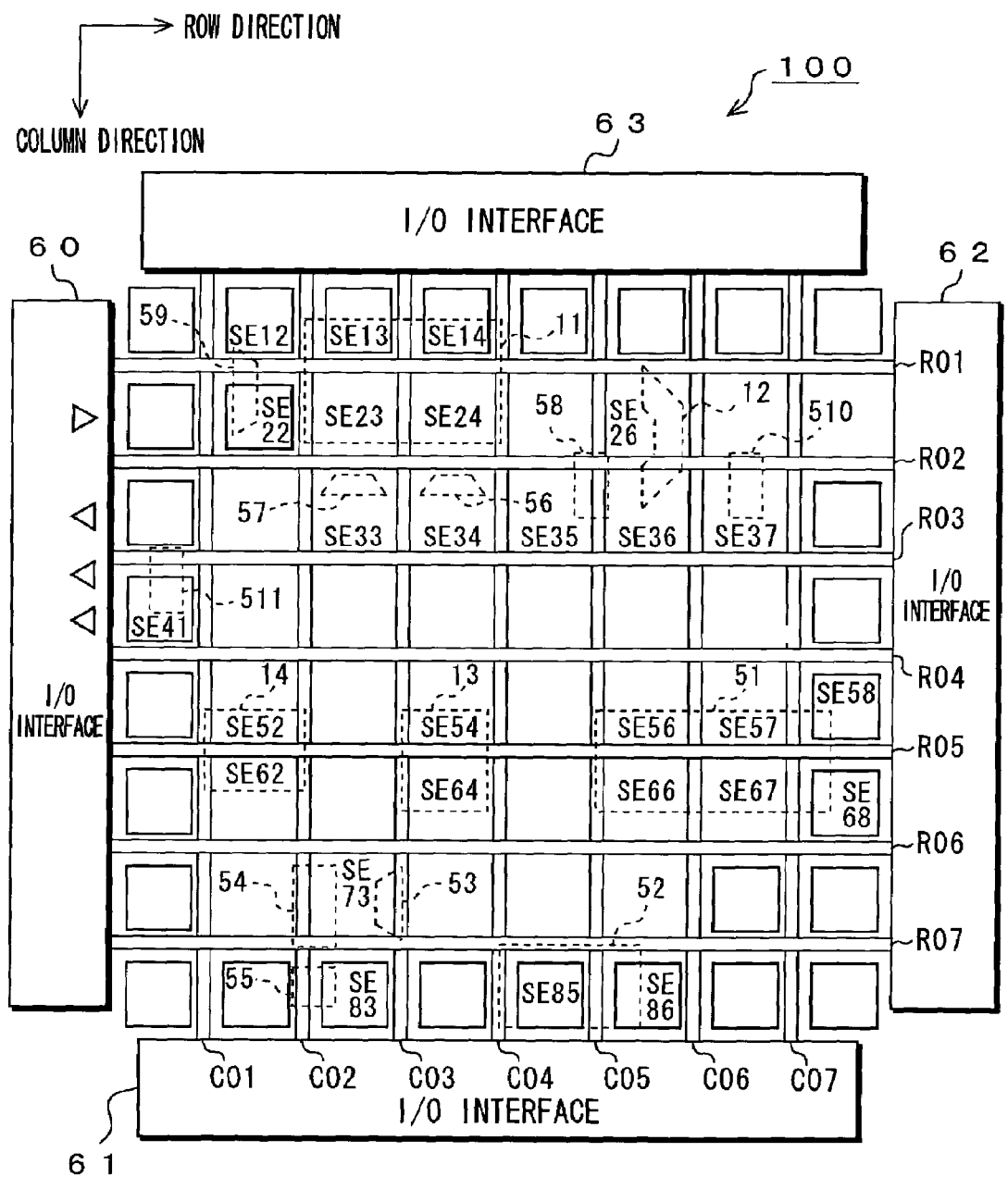
FIG. 8 is a plan view of the operation-processing device 100 for showing a layout construction example thereof.

The following will describe a layout construction example of the operation-processing device 100. In FIG. 8, on the semiconductor chip prepared as shown in FIG. 7, an layout of the operation-processing device 100 is provided by defining the register array 11, the ALU12, the decoder 13, the ROM cell 14, an execution state machine 51, an instruction read state machine 52, a selector 53, a program counter 54, an incrementer 55, a selector 56, a selector 57, an inputting selector 59, and latch circuits 58, 510, and 511 which are enclosed by broken lines as shown in FIG. 8.

Note here that the instruction-execution-controlling portion 50 shown in FIG. 1 is constituted of the execution state machine 51, the instruction read state machine 52, the selector 53, the program counter 54, the incrementer 55, the selector 56, the selector 57, the inputting selector 59, and the latch circuits 58, 510, and 511. In this embodiment, the register array 11 is constituted with, for example, the allocated cell blocks SE13, SE14, SE23, and SE24. To constitute 8192 registers, r0-rn, the memory cells MSE of these cell blocks SE1, SE14, SE23, and SE43 are used. The memory cells MSE are allocated so that the register array 11 may be provided with plural registers, r0-rn holding arbitrary values based on the write address Aw and the write control signal Sw and output the values based on a read address Ar.

As the write port 15 and the read port 16 shown in FIG. 2, for example, an input buffer circuit or an output buffer circuit of the arithmetic/logic operation elements LAY of the cell blocks SE1, SE14, SE23, and SE43 may be used. To provide wiring between these, the row wiring lines RO1 and RO2 and the column wiring lines CO2, CO3, and CO4 are used for interconnection. The ALU12 is constituted by allocating the cell blocks SE26, SE36, etc. to it. The ALU 12 is constituted of the arithmetic/logic operation elements LAY of the cell blocks SE26 and SE36. To provide wiring between these, the row wiring lines RO1 and RO2, and the column wiring lines CO5 and CO6, etc. are used for interconnection.

The decoder 13 is constituted by allocating the cell blocks SE54, SE64, etc. to it. The decoder 13 is constituted of the arithmetic/logic operation elements LAY of the cell blocks SE54, SE56, etc. To provide wiring between these, the row wiring line RO5, the column wiring lines CO3 and CO4, etc. for interconnection. The ROM cell 14 is constituted by allocating the cell blocks SE52, SE62, etc. to it. The memory cells MSE of the cell blocks SE52, SE62, etc. are used to constitute the read only memory. An input buffer circuit and an output buffer circuit of the arithmetic/logic operation elements LAY are used to constitute write/read circuits of the operation program AP. To provide wiring between these, the row wiring line RO5, the column wiring lines CO0 and CO2, etc. are used for interconnection.

The execution state machine 51 is constituted by allocating the cell blocks SE56, SE57, SE58, SE66, SE67, SE68, etc. to it. To provide wiring between these, the row wiring line RO5, the column wiring lines CO5, CO6 and CO7, etc. are used for interconnection. The execution state machine 51 performs the register-to-register addressing processing which selects one register, r1 based on the operation instructions #I1-#I4 and, based on a value of this selected register, r1, selects another register. The instruction read state machine 52 is constituted by allocating the cell blocks SE85, SE86, etc. to it. To provide wiring between these, the row wiring line RO7, the column wiring lines CO4, CO5, and CO6, etc. are used for interconnection. The selector 53 and the program counter 54 are constituted by allocating the cell block SE73, etc. to them. To provide wiring between these and other circuits, the row wiring line RO7, the column wiring line CO2, etc. are used for interconnection. The incrementer 55 is constituted by allocating the cell block SE83, etc. to it. To provide wiring between these and other circuits, the row wiring line RO7, the column wiring lines CO2 and CO3, etc. are used for interconnection.

The selector 56 is constituted by allocating the cell block SE34 etc. to it. To provide wiring between these and other circuits, the column wiring lines CO3 and CO4 etc. are used for interconnection. The selector 56 selects either one of a read execution address Ar to select one register or a read address Ar to select this register again. The selector 57 is constituted by allocating the cell block SE33, etc. to it. To provide wiring between these and other circuits, the column wiring lines CO2 and CO3 etc. are used for interconnection. The selector 57 selects either one of a write execution address to select one register, ri or a write address Aw to select this register again.

The inputting selector 59 is constituted by allocating the cell blocks SE12, SE22, etc. to it. To provide wiring between these and other circuits, the row wiring line RO, the column wiring line CO1, etc. are used for interconnection. The latch circuit 58 is constituted by allocating the cell block SE35 etc. to it. To provide wiring between these and other circuits, the row wiring line RO2, the column wiring line CO5, etc. are used for interconnection. The latch circuit 510 is constituted by allocating the cell block SE37 etc. to it. To provide wiring between these and other circuits, the row wiring line RO2, the column wiring lines CO6, and CO7, etc. are used for interconnection. The latch circuit 511 is constituted by allocating the cell block SE41 etc. to it. To provide wiring between these and other circuits, the row wiring line RO3, the column wiring line CO1, etc. are used for interconnection.

Figure 9:
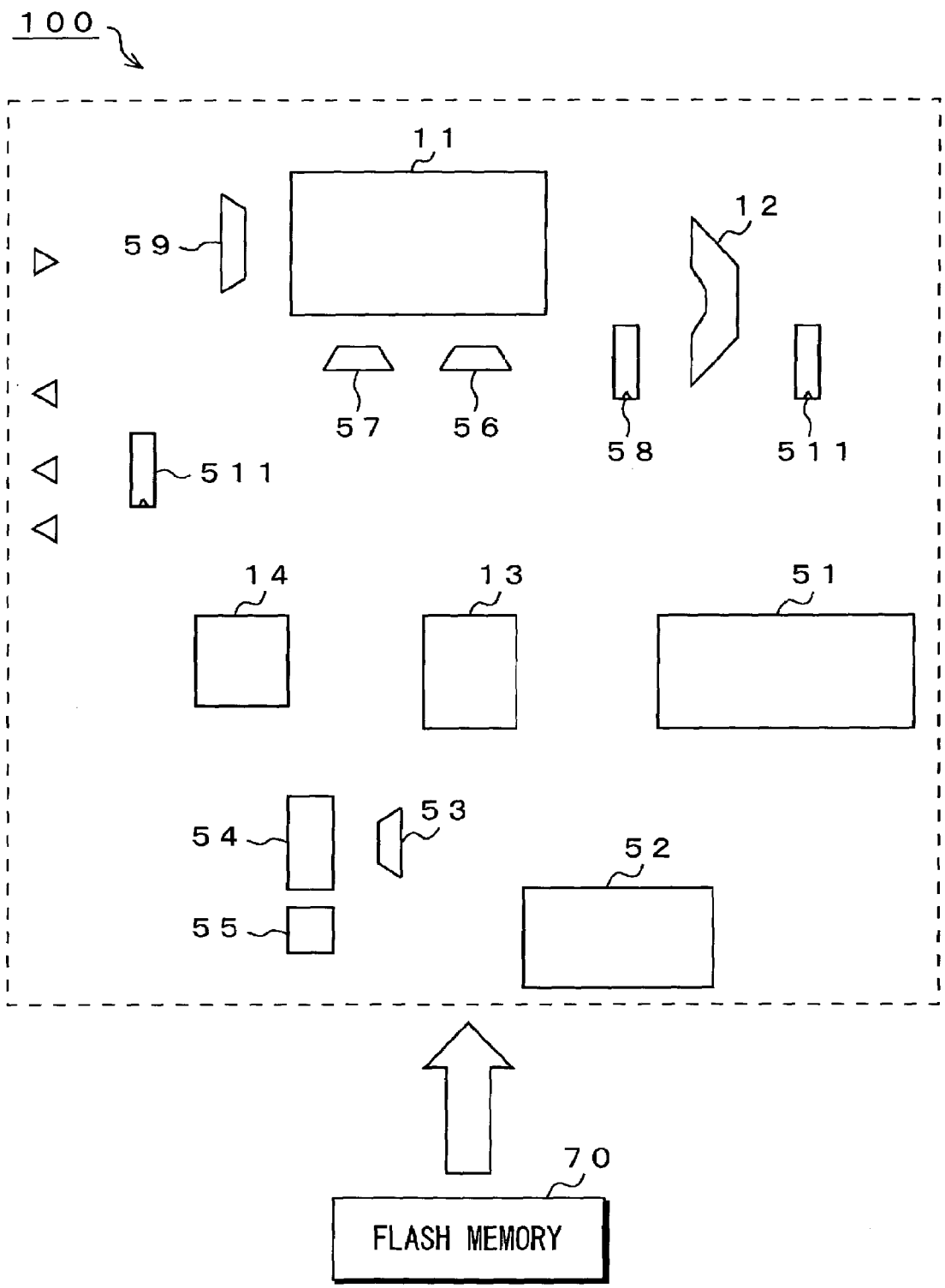
FIG. 9 is a diagram for showing a wiring construction example of the operation-processing device 100.

The following will describe a wiring construction example of the operation-processing device 100. In FIG. 9, the operation-processing device 100 is constituted by interconnecting, based on wiring information, the register array 11, the ALU12, the decoder 13, the ROM cell 14, the execution state machine 51, the instruction read state machine 52, the selector 53, the program counter 54, the incrementer 55, the selector 56, the selector 57, the inputting selector 59, and the latch circuits 58, 510, and 511 which are defined as shown in FIG. 8. In this embodiment, an electronic apparatus, for example, a printed wiring board is amounted with a programmable logic device that constitutes the operation-processing device 100 and a flash memory 70, which is one example of a rewritable nonvolatile memory device.

This flash memory 70 stores wiring information which is used to turn ON switch elements that are arranged everywhere between the memory cells in each cell block SEij, inter-arithmetic/logic-operation element wiring lines, between the cell blocks SE11-SE88, between the row wiring lines RO1-RO7 that interconnect these cell blocks and the I/O interfaces, etc.

FIG. 10 is a table for showing examples of the wiring information stored in the flash memory 70. The wiring information example shown in FIG. 10 indicates signal lines L1-L38, . . . that correspond to wiring information items D1-D38, . . . and use of signals or data etc. transmitted through these signal lines L1-L38. The wiring information items D1-D38, . . . stored in the flash memory 70 are created in a circuit technology language and prepared as a net list (interconnection information). In this embodiment, the wiring information items D1-D38, . . . are rewritten on demand in accordance with functions of this operation-processing device 100.

Note here that the operation program AP is written to the ROM cell 14. In this embodiment, the operation program AP contains the operation instructions #I1-#I4 to perform the register-to-register addressing processing. This operation program AP may be linked with the wiring information items D1-D38, . . . , to be output to the decoder 13. The flash memory 70 can function also as the ROM cell 14.

Figure 11:
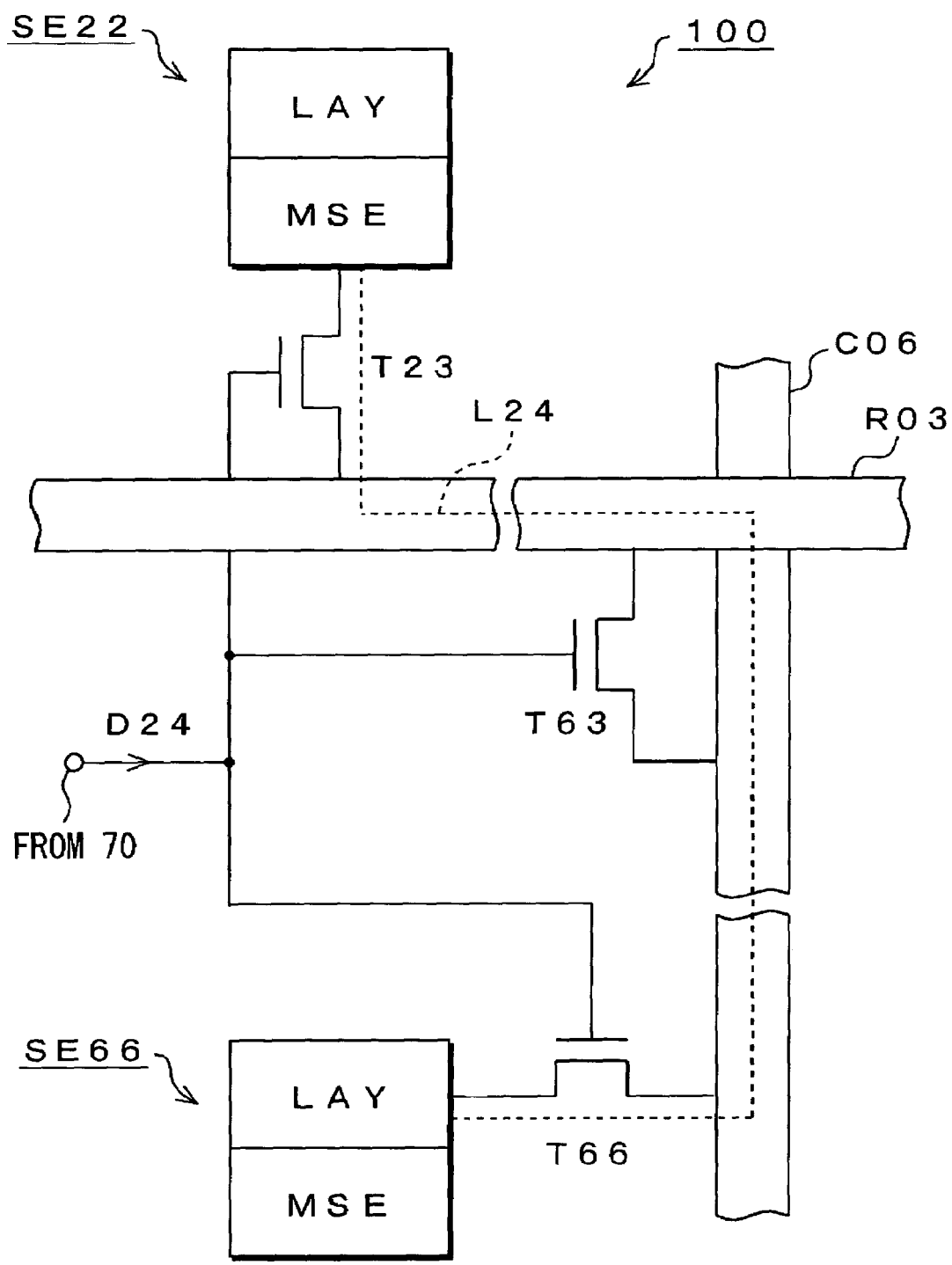
FIG. 11 is a diagram for showing an example of connection in the operation-processing device 100.

IT The following will describe an example of connection in the operation-processing device 100. According to the connection example shown in FIG. 11, in a case where the cell blocks SE22 and SE66 are connected to each other through a signal line L24, a switching transistor T arranged between the cell block SE22 and the row wiring line RO3, a transistor T63 arranged between the row wiring line RO3 and the column wiring line CO6, and a transistor T66 arranged between the column wiring line CO6 and the cell block SE66 are used. The transistors T23, T63, and T66 can all be controlled at the gate. Based on this assumption, upon power application, for example, the wiring information item D24 of the table shown in FIG. 11 is read from the flash memory 70. The wiring information item D24 is set to the gate of each of the transistors T23, T63, and T66. This causes the transistors T23, T63, and T66 to be turned ON. When these transistors T23, T63, and T66 are turned ON, the cell block SE22 and the row wiring line RO3, the row wiring line RO3 and the column wiring line CO6, and the column wiring line CO6 and the cell block SE66 are electrically interconnected respectively, thereby enabling the signal line L24 to be constructed. In this embodiment, the cell block SE22 is allocated to the selector 59, the cell block SE66 is allocated to the execution state machine 51, and the signal line L24 is used when transmitting a selection control signal S24 for this selector 59.

In such a manner, the wiring information items D1-D38, . . . are set to the switching transistors arranged everywhere between the memory cells in each cell block SEij, so that based on these wiring information items D1-D38, . . . , circuit elements are connected to each other arbitrarily through these transistors. Thus, the register array 11, the ALU12, the decoder 13, the ROM cell 14, the instruction-execution-controlling portion 50, etc. are connected to each other. By this setting, it is possible to reduce a size of the operation program AP stored in the ROM cell 14.

Figure 12:
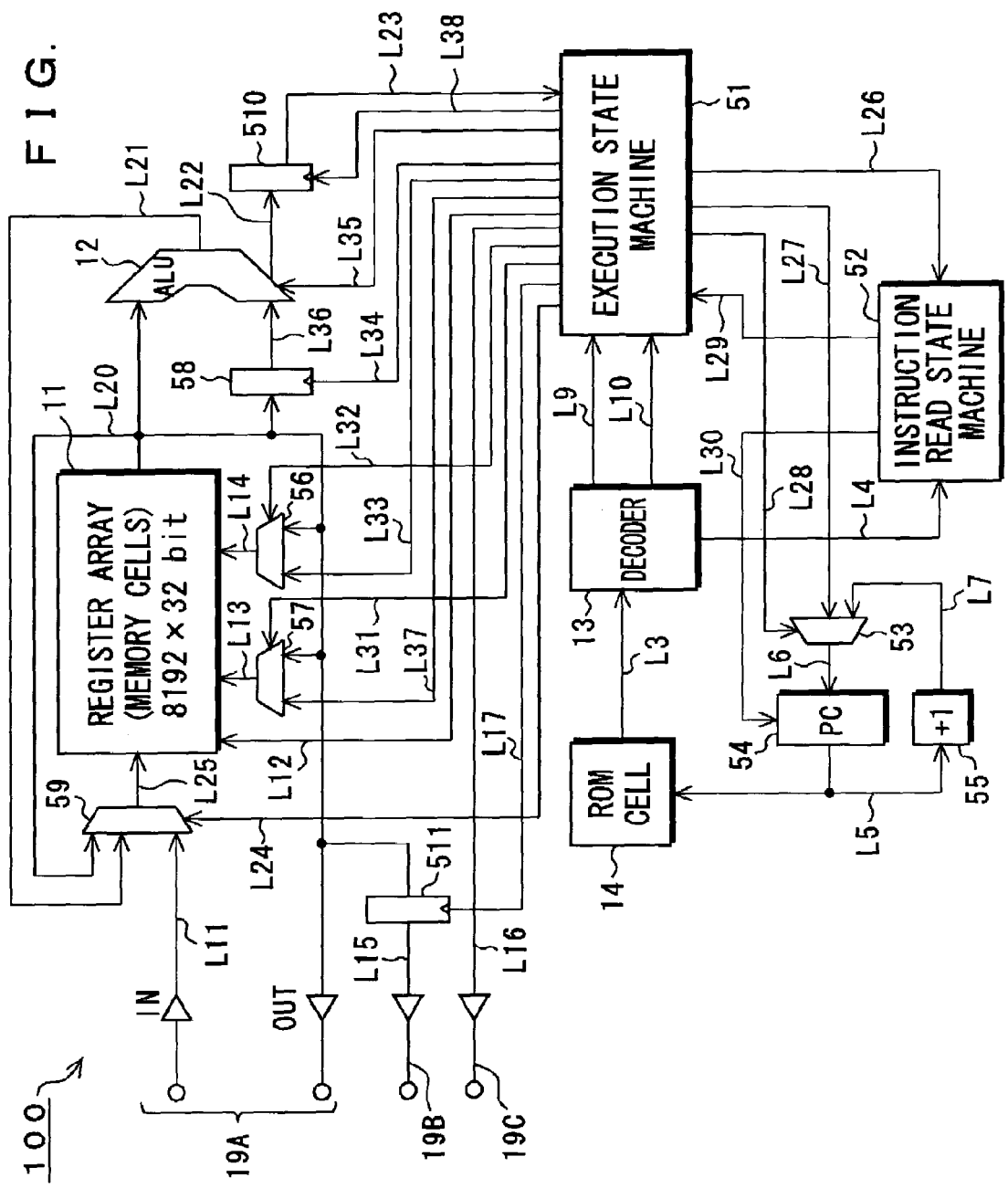
FIG. 12 is a circuit connection diagram for showing a circuit construction example of the operation-processing device 100.

The following will describe a circuit construction of the operation-processing device 100. FIG. 12 shows a circuit diagram of the operation-processing device 100 in which the components are connected to each other upon power application. It describes plural signal lines etc. about the configuration diagram of the operation-processing device 100 shown in FIG. 1. These described signal lines are based on the wiring information items D1-D38 etc. recorded in the flash memory 70. The wiring information items D1-D38 etc. are prepared for each of the signal lines. In this embodiment, such switching transistors as shown in FIG. 11 are turned ON based on the wiring information item D3, to cause a signal line L3 to connect the decoder 13 and the ROM cell 14 to each other. Through the signal line L3, the operation program AP is transmitted. Similarly, a signal line L4 connects the decoder 13 and the instruction read state machine 52 to each other based on the wiring information item D4. Through the signal line L4, an instruction control signal S4 is transmitted.

A signal line L5 connects the ROM cell 14, the instruction read state machine 52, and the program counter 54 to each other based on the wiring information item D5. Through the signal line L5, the count output signal S5 is transmitted. A signal line L6 connects the selector 53 and the program counter 54 to each other based on the wiring information item D6. Through the signal line L6, either a branch-off control signal S27 or an increment output signal S7 is transmitted as a selector output. A signal line L7 connects the incrementer 55 and the selector 53 to each other based on the wiring information item D7. Through the signal line L7, the increment output signal S7 is transmitted. Signal lines L9 and L10 connect the decider 13 and the execution state machine 51 to each other based on the wiring information item D10. Through the signal line L9, an instruction signal S9 is transmitted, and through the signal line L10, each augment signal S10 is transmitted. A signal line L11 connects the data bus 19A and the inputting selector 59 to each other based on the wiring information item D11. Through the signal line L11, data (DATA) is transmitted. A signal line L12 connects the register array 11 and the execution state machine 51 to each other based on the wiring information item D12. Through the signal line L12, the write control signal Sw is transmitted.

A write address line L13 connects the register array 11 and the selector 57 to each other based on the wiring information item D13. Through the write address line L13, a write address Aw is transmitted. A read address line L14 connects the register array 11 and the selector 56 to each other based on the wiring information item D14. Through the read address line L14, a read address Ar is transmitted. A signal line L connects the latch circuit 511 and an address bus 19B to each other based on the wiring information item D15. Through the signal line L15, an external address is transmitted. A signal line L16 connects the execution state machine 51 and a control bus 19C based on the wiring information item D16. Through the signal line L16, an external control signal S16 is transmitted. A signal line L17 connects the latch circuit 511 and the execution state machine 51 to each other based on the wiring information item D17. Through the signal line L17, a latch control signal S17 is transmitted.

A data signal line L20 connects the register array 11, the ALU12, the data bus 19A, the selector 57, the selectors 56 and 58, and the inputting selector 59 to each other based on the wiring information item D20. Through the signal line L20, data (DATA), an X value, a Y value, etc. are transmitted. A signal line L21 connects the ALU12 and the inputting selector 59 to each other based on the wiring information item D21. Through the signal line L21, an operation result value Z is transmitted. A signal line L22 connects the ALU12 and the latch circuit 510 to each other based on the wiring information item D22. Through the signal line L22, a coincidence detection signal S22 is transmitted. A signal line L connects the execution state machine 51 and the latch circuit 510 to each other based on the wiring information item D23. Through the signal line L23, a flag condition signal Sis transmitted. A signal line L24 connects the inputting selector 59 and the execution state machine 51 to each other based on the wiring information item D24. Through the signal line L24, a selection control signal S24 is transmitted.

A signal line L connects the inputting selector 59 and the register array 11 based on the wiring information item D25. Through the signal line L25, an operation result value Z, an augend X value, etc. are transmitted. A signal line L26 connects the execution state machine 51 and the instruction read state machine 52 to each other based on the wiring information item D26. Through the signal line L26, an execution end signal S26 is transmitted. A signal line L27 connects the execution state machine 51 and the selector 53 to each other based on the wiring information item D27. Through the signal line L27, a branch-off control signal S27 is transmitted. A signal line L28 connects the execution state machine 51 and the selector 53 based on the wiring information item D28. Through the signal line L28, a selection control signal S28 is transmitted.

A signal line L29 connects the instruction read state machine 52 and the execution state machine 51 to each other based on the wiring information item D29. Through the signal line L29, an instruction execution start signal S29 is transmitted. A signal line L30 connects the instruction read state machine 52 and the program counter 54 to each other based on the wiring information item D30. Through the signal line L30, a count control signal S30 is transmitted. A signal line L31 connects the selector 57 and the execution state machine 51 based on the wiring information item D31. Through the signal line L31, a selection control signal S31 is transmitted. A signal line L32 connects the selector 56 and the execution state machine 51 based on the wiring information item D32.

Through the signal line L32, a selection control signal S32 is transmitted. An address signal line L33 connects the selector 56 and the execution state machine 51 based on the wiring information item D33. Through the address signal line L33, a read address Ar is transmitted. A signal line L34 connects the latch circuit 58 and the execution state machine 51 based on the wiring information D34. Through the signal line L34, a latch control signal S58 is transmitted.

A signal line L35 connects the ALU12 and the execution state machine 51 based on the wiring information item D35. Through the signal line L35, an ALU control signal S35 is transmitted. A signal line L36 connects the latch circuit 58 and the ALU12 based on the wiring information item D36. Through the signal line L36, X value "0" etc. is transmitted as a latch output. An address signal line L37 connects the selector 57 and the execution state machine 51 based on the wiring information item D37. Through the address signal line L37, a write address Aw is transmitted. A signal line L38 connects the execution state machine 51 and the latch circuit 510 based on the wiring information item D38. Through the signal line L38, a latch control signal S38 is transmitted.

As described above, according to the method of constructing the operation-processing device 100 of the second embodiment of the present invention, upon power application, the register array 11, the ALU12, the decoder 13, the ROM cell 14, the execution state machine 51, the instruction read state machine 52, the selector 53, the program counter 54, the incrementer 55, the selector 56, the selector 57, the inputting selector 59, and the latch circuits 58, 510, and 511 are connected to each other based on the wiring information items D1-D38, . . . , etc. read from the flash memory 70. It is thus possible to, upon power application, construct the programmable operation-processing device 100 which can perform the register-to-register addressing processing using the execution state machine 51 to select one register, r10 based on the operation instructions #I1-#I4 and, based on value "0" held in this register, r10, select another register r0. A one-chip processor including a memory can be constructed efficiently.

Once this device is constructed, the decoder 13 decodes the operation instructions #I1-#I4 from an operation program AP to operate the ALU12, so that the instruction-execution-controlling portion 50 controls the register array 11 and the ALU12 in order to execute the operation instructions #I1-#I4 decoded by the decoder 13. The ALU12 performs operations on an X value and a Y value read from the register array 11. An operation result value Z can be stored in the register, r0 that corresponds to value "0" indicated by that register, r10.

Further, the instruction-execution-controlling portion 50 can handle all components having a memory function in the PLD as a register, so that this processor can operate at a higher speed than such a type of processor as to distinguish between the memory cells and the registers in access. Moreover, it is possible to reduce an area of a substrate occupied by the CPU, the RAM, the ROM, etc. as compared to a case where they are arranged on the substrate individually. An electronic apparatus such as a portable terminal unit to which this operation-processing device 100 is applied can be compacted.

(3) Third Embodiment

FIG. 13 is a block diagram for showing a configuration of an operation-processing system 100' according to the third embodiment of the present invention.

In this embodiment, in a case where the operation-processing device (second operation-processing device) 100' is provided which performs operation processing based on an operation program to perform the register-to-register addressing processing by specifying plurality registers, to decode a type of a register by obtaining a compressed program created by a program creation system and, based on this register type, restore the number of bits of an instruction to specify this register and restore a program having an instruction structure with a predetermined instruction length so that a memory capacity of a ROM etc. to store program data can be reduced and where a PLD comprised of memory cells and logic operation elements is used to constitute a processor, a ratio of memory cells occupied to function as the ROM can be reduced (second operation-processing method). Further, the program creation system can vary the length of the instruction in accordance with a frequency at which the registers are used and set short length instructions to a frequently accessed register (third operation-processing method).

An operation-processing system 10 shown in FIG. 13 creates a program by editing instructions to perform operation processing based on an operation program, which performs register-to-register addressing processing based on a predetermined programming language on one hand and processes data using this program and plural registers on the other hand. In the operation-processing system 10, a program creation device 200 that constitutes a program creation system I is prepared. This is done so in order to create a program to operate a newly designed and manufactured operati, on-processing device 100'. The operation-processing device 100' constitutes a program execution system II and implements an instruction execution/operation portion, a storage portion, plural registers, etc. The program creation device 200 reduces the number of bits of an instruction to specify a register based on a frequency at which the registers are used in the operation-processing device 100' and writes a register type in an instruction structure of this program to create compressed programs AP having different instruction lengths. This is done so in order to reduce a memory capacity of the program storing storage portion mounted in the operation-processing device 100'.

The program creation device 200 has, for example, a database 21, a keyboard 22, a mouse 23, a display device 24, and a control device 25. The database 21 stores data necessary for creating programs for the operation-processing device 100'. It stores, for example, "global variable declaration", "function declaration", "local variable declaration", "substitution", "addition", "comparison", and "branch-off" which are required to write a program in the C language. To the database 21, the control device is connected, to which, the keyboard 22, the mouse 23, and the display device 24 are connected. In the program creation device 200, a program is created in the C language by using the keyboard 22 and the mouse as displaying the program on a screen of the display device 24.

For example, in a case where the operation-processing device 100' to be designed and manufactured newly uses N number of registers and when the N number of registers are assigned serial numbers of 1 through N sequentially, "local variable declaration" is performed to declare a group of the first through K'th registers as having a high use frequency and "global variable declaration" is performed to declare a group of the (K+1)'th through N'th registers as having a low use frequency. These declarations are specified using the keyboard 22 and the mouse 23, to classify the register types into two groups so that the instructions having a smaller number of bits may be set to the register having a higher use frequency and the instructions having a larger number of bits may be set to the registers having a lower use frequency. If, for example, about 4000 through 8000 registers are required in the operation-processing device 100', the instruction needs to have 12-13 bits in order to specify them.

The control device varies the length of the instruction in accordance with a use frequency of the registers. This is done so in order to set instructions having a short length to the frequently accessed register. The register having a higher use frequency is assigned a smaller number of instruction bits and the register having a lower use frequency is assigned a larger number of instruction bits. The operation-processing device 100' obtains compressed programs AP created by this program creation device 200 to decode a type of a register and, based on this register type, restores the number of bits of an instruction for specifying this register to specify plural registers based on an instruction having a predetermined length, thereby performing an arbitrary operation.

The operation-processing device 100' has, for example, an instruction decoding portion 3, a storage portion 4, a register array 11', and an instruction execution/operation portion 50'. The register array 11' is a set of plural registers. The storage portion 4 stores a compressed program AP for specifying these registers in the register array 11'. The compressed program AP is created by the program creation device 200 and used. For example, the compressed program AP is written using a ROM writer etc. into the storage portion 4 for storing a program prepared in the operation-processing device 100'. This is because there is a case where as for the operation-processing device 100', the processor may be constructed of a programmable logic device (PLD) comprised of plural memory cells and arithmetic/logic elements. An occupation ratio of the memory cells which function as the ROM can be reduced. Of course, such a method may be employed as to manufacture the storage portion 4 for storing program separately from the operation-processing device 100', store the compressed program AP in the separate storage portion 4, and mount them on the same substrate. This is because as the storage portion 4, a read only memory (ROM) or an BEPROM (flash memory) is used.

To the storage portion 4, the instruction decoding portion 3 is connected, so that from this storage portion 4 a compressed program AP is read to decode a type of register and, based on this register type, the number of bits of an instruction to specify this register is restored. This is done so in order to provide a uniform length of instructions so that plural registers may be specified on the basis of this instruction. To the instruction decoding portion 3, the instruction execution/operation portion 50' is connected, to which the register array 11' is connected. The instruction execution/operation portion 50' executes arbitrary operations by specifying a relevant register in the register array 11' based on a program having a predetermined instruction length restored by the instruction decoding portion 3.

The following will describe an operation-processing method related to the present invention with reference to an example of processing in this operation-processing system 10. FIG. 14 is a flowchart for showing an example of processing in the operation-processing system 10. In this system 10, it is assumed that the program creation system I creates a program by editing instructions to perform operation processing based on an operation program which performs the register-to-register addressing processing based on a predetermined programming language and the program execution system II processes data by using this program and the plural registers. Such a case is assumed that this operation-processing device 100' uses N number of registers and the N number of registers are assigned serial numbers of 1 through N sequentially (second operation-processing method).

Figure 14A:
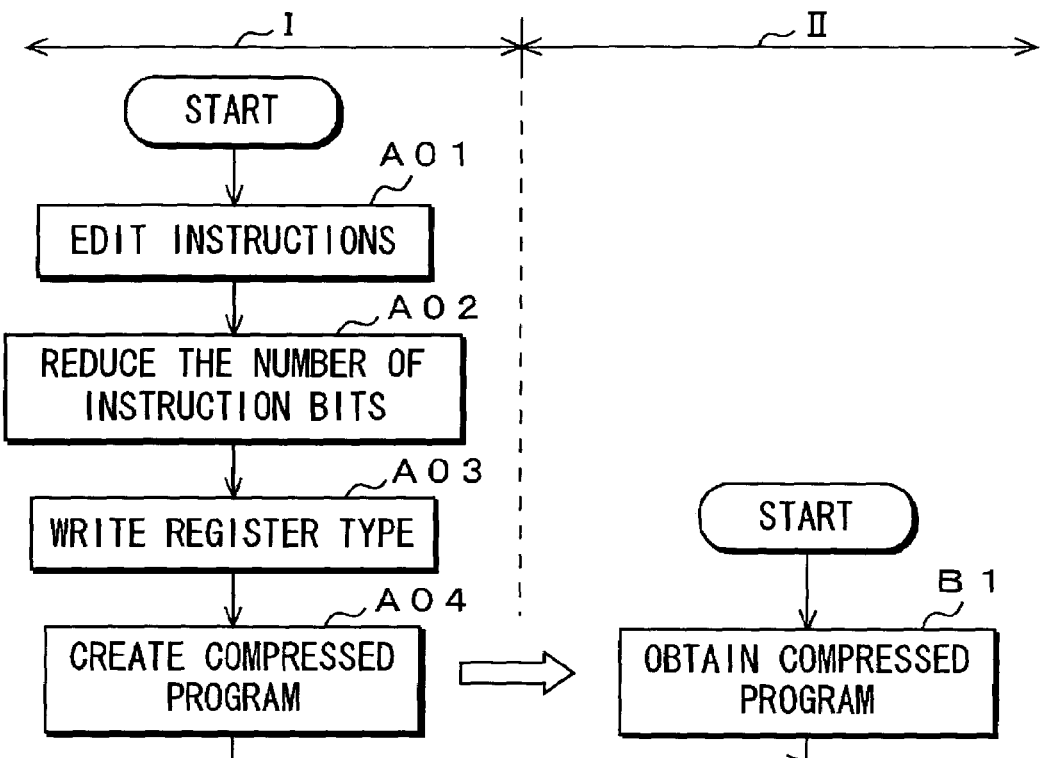
FIG. 14 is a flowchart for showing an example of processing in the operation-processing system 10.

Under these processing conditions, the program creation system edits instructions to perform operation processing based on an operation program which performs the registerto-register addressing processing based on a predetermined programming language at step A01 of the flowchart of FIG. 14A. At step A02, the process reduces the number of bits of an instruction which specifies a register based on a frequency at which this register is used, thereby reducing the instruction length. For example, if the number of bits of an instruction which specifies any one of a group comprising the (K+1)'th through N'th registers is n and the number of bits of an instruction which specifies any one of a group comprising the first through K'th registers is m, the number of bits of an instruction which specifies any one of the group comprising the first through K'th registers is reduced in such a manner that, for example, n−m=8 (bits).

Then, at step A03, the process writes the register type in an instruction structure of this program. For example, supposing that a type of a register having "register No. 1" of one pair of registers to hold an augend and an addend to be "register type 1" and a type of a register having "register No. 2" of them to be "register type 2", if the group of the first through K'th registers has a higher use frequency, code "0" is written to "register type 1" and "register type 2". If the group of the (K+1)'th through N'th registers has a lower use frequency, code "1" is written to "register type 1" and "register type 2".

At step A04, compressed programs AP having different instruction lengths are created. In these compressed programs AP, the number of bits of an instruction which specifies any one of the group of the first through K'th registers is m and the number of bits of an instruction which specifies any one of the group of the (K+1)'th through N'th registers is n. In the above example, an instruction length of an instruction pattern involving specification of any one of the group of the first through K'th registers is 16 bits shorter than that involving specification of any one of the group of the (K+1)'th through N'th registers.

Figure 14B:
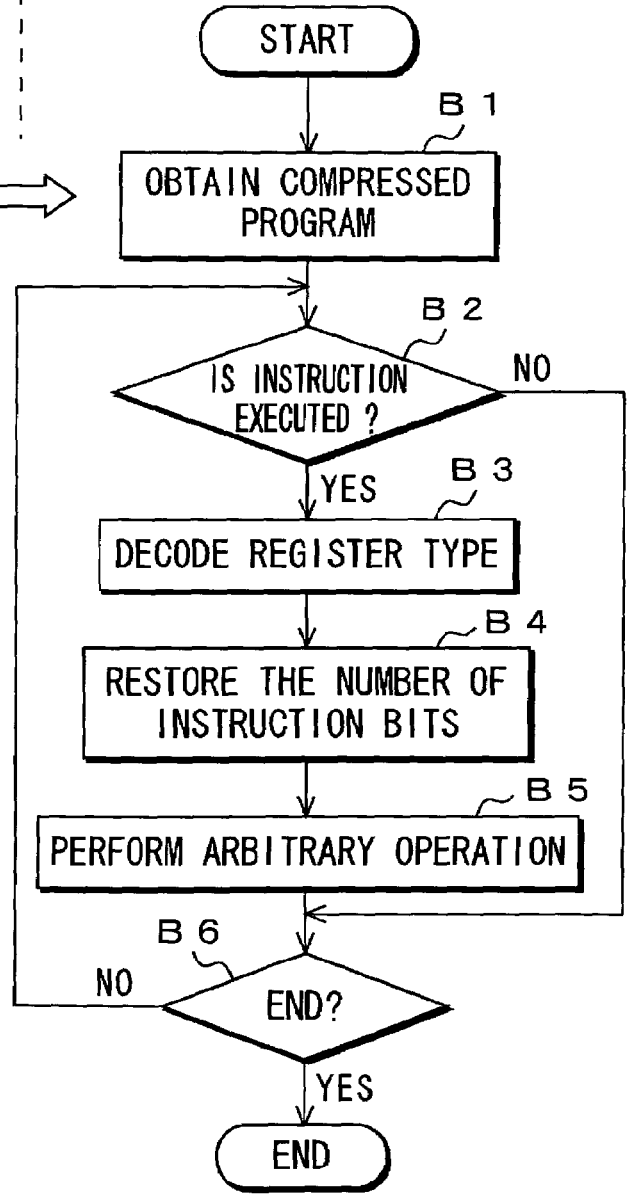

The program execution system, on the other hand, obtains the compressed programs AP created by the program creation system, at step B1 of a flowchart shown in FIG. 14B. For example, the compressed programs AP are written into the storage portion 4 for storing programs constructed in the operation-processing device 100', by using a ROM writer etc. In the compressed program AP, instructions having a smaller number (=m) of bits are set to the register having a higher use frequency and instruction having a larger number (=n) of bits are set to the register having a lower use frequency. At step B2, it decides whether the instruction is to be executed. This decision is made by a known technology. To execute an instruction, a type of a register is decoded at step B3. For example, if code "0" is written to "register type 1" and "register type 2", the register Nos. of the group of the first through K'th registers are decoded as those of the registers having a higher use frequency, and if code "1" is written to "register type 1" and "register type 2", the register Nos. of the group of the (K+1)'th through N'th registers are decoded as being those of the registers having a lower use frequency.

At step B4, based on these decoded register types, the number of bits of the instruction which specifies these registers is restored. For example, "0" is added to high-order bits, high-order eight bits in this example, of the instruction having m number of bits for the group of the first through K'th registers. The number of bits of the instruction for the group of the first through K'th registers is equalized to n, which is the number of bits of the instruction for the group of the (K+1)'th through N'th registers. Based on an instruction having this restored predetermined length, it specifies plural registers, to perform arbitrary operations at step B5. Then, at step B6, it decides whether the operation processing should end. If the operation processing is not to end, it returns to step B2 to decide whether an instruction should be executed, thus continuing the operation processing. Otherwise, it detects power-OFF information etc., to end this operation processing.

As described above, in the operation-processing system 10 according to the third embodiment of the present invention, on one hand, a program is created by editing instructions to perform operation processing based on an operation program which performs the register-to-register addressing processing based on a predetermined programming language and, on the other hand, to process data by using this program and plural registers, the program creation device 200 reduces the number of bits of an instruction which specifies a register based on a frequency at which this register is used and writes a type of the register into an instruction structure of this program, thus creating a compressed program AP having an different instruction length. The operation-processing device 100' obtains the compressed program AP created by the program creation device 200 to decode the register type and, based on this register type, restore the number of bits of the instruction which specifies this register and specifies plural registers based on the instruction having the predetermined length to perform an arbitrary operation. Therefore, the program creation system I can vary the length of the instruction in accordance with a frequency at which the registers are used, to set a short length instruction to a frequently accessed register. Accordingly, the program execution system II can set compressed instructions to the storage portion 4 such as a ROM, thereby reducing a memory capacity of the storage portion 4 which stores program data. Further, in a case where the processor is constructed of a PLD comprised of memory cells and logic operation elements, an occupation ratio of the memory cells which function as the ROM can be reduced, so that the other memory cells may be allocated to the registers as many as possible.

(4) Fourth Embodiment

Figure 15:
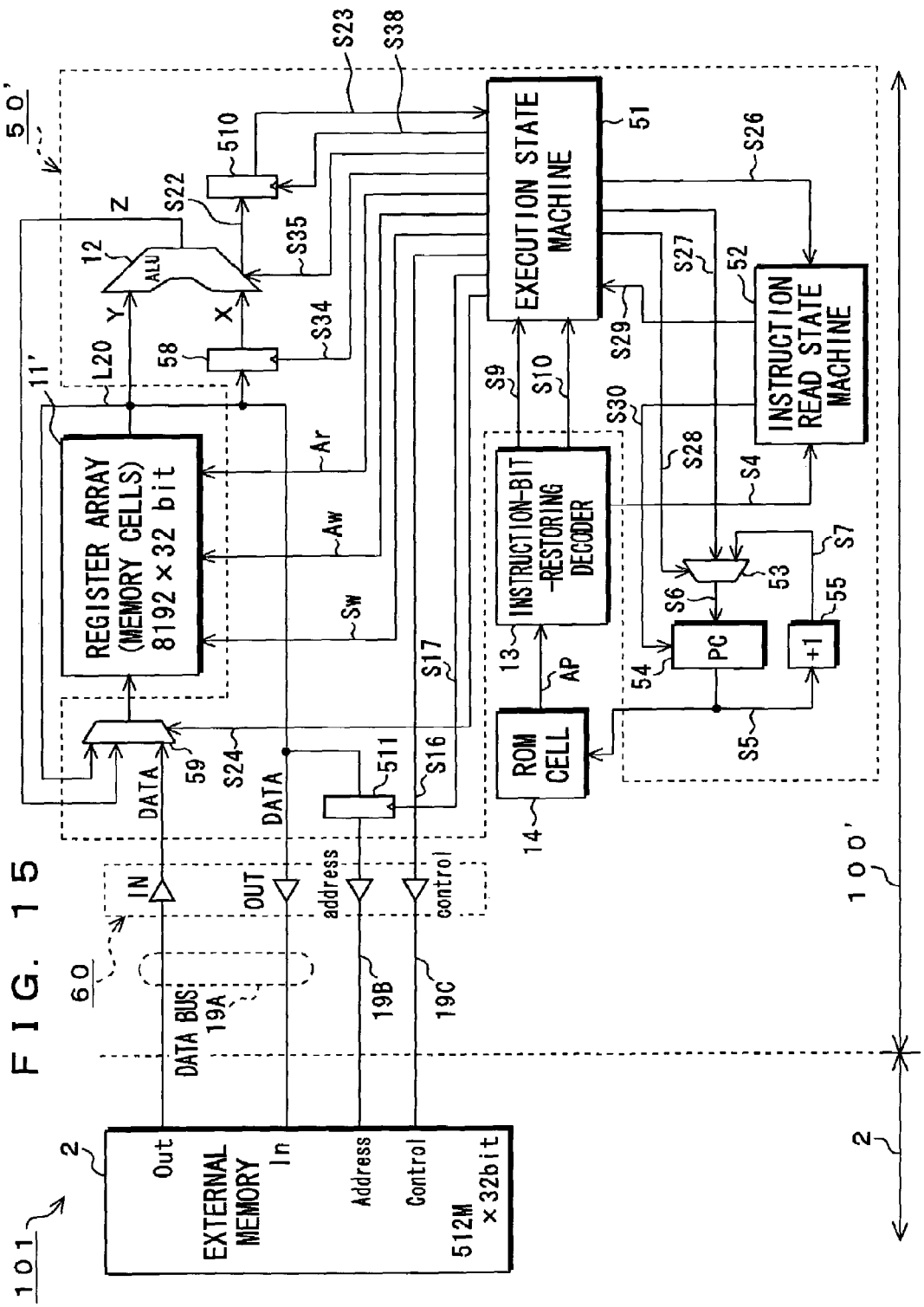
FIG. 15 is a block diagram for showing a configuration of a microprocessor 101 according to a fourth embodiment of the present invention.

FIG. 15 is a block diagram for showing a configuration of a microprocessor 101 according to the fourth embodiment of the present invention.

In this embodiment, a microprocessor 101 is constituted by connecting an external memory 2 to an operation-processing device 100', thereby performing operation processing based on an operation program that performs the register-to-memory addressing processing by specifying plural registers. Of course, operation instructions to perform register-to-register addressing processing may be written into a compressed program AP as in the case of the first embodiment. In this case, such selectors 56 and 57 as shown in FIG. 1 can be connected to an input portion of a register array 11' shown in FIG. and controlled by a execution state machine 51. Effects of the first embodiment and those of the second embodiment can be obtained as overlapped with each other.

In this embodiment, a compressed program AP comprised of machine-language instructions which is created by a program creation system I is obtained to decode a type of a register and, based on this register type, the number of bits of an instruction which specifies this register is restored, thereby restoring a program that has an instruction structure with a predetermined instruction length. By doing so, a memory capacity of a ROM etc. for storing program data can be reduced.

By the microprocessor 101 shown in FIG. 15, the number of bits of an instruction which specifies a register based on a frequency at which this register is used is reduced beforehand and data is processed based on a compressed program AP having a different instruction length which has a register type written in an instruction structure of this program. This processor 101 obtains the compressed program AP created by the program creation device 200 to decode the register type and, based on this register type, restores the number of bits of an instruction that specifies this register to specify plural registers based on the instruction having the predetermined length, thereby performing arbitrary operations.

The microprocessor 101 has, for example, the register array 11', an instruction-bit-restoring decoder (which corresponds to the decoder in the first embodiment) 13, a ROM14, and an instruction execution/operation portion 501. The register array 11' is a set of plural registers. The register array 11' is provided with, for example, registers ri (i=1-8191) of 8192 pieces×32-bit. Each register ri holds an arbitrary value based on a write address Aw and a write control signal Sw and outputs a value of an augend X, an addend Y, etc. based on a read address Ar.

This microprocessor 101 is mounted with the ROM14 for storing program, which is one example of the storage portion, in which a compressed program AP for specifying a relevant register ri in the register array 11' is stored. The compressed program AP has a machine-language instruction structure and is created by the program creation device 200. For example, a compressed program AP is written into the ROM14 by using a ROM writer etc. After an instruction is executed, the compressed program AP is output from the ROM14 based on a count output signal S5 from a program counter 54.

The instruction-bit-restoring decoder 13 is connected to the ROM14, so that from this ROM14, a machine-language instruction compressed program AP is read to generate an instruction control signal S4, an instruction signal S9, and each augment signal S10. The instruction signal S9 contains a load instruction, an add instruction, a cmp instruction, and a jump instruction. Each augment signal S10 contains access method #1, access method #2, "register type 1", "register type 2", register Nos. r0, r1, . . . , a flag condition, a jump address, etc.

This compressed program AP includes an operation instruction to perform the register-to-register addressing processing. In this processing, one register is selected on the basis of the operation instruction and, based on a value held in this selected register, an external memory 2 is selected. This processing is performed by, for example, access method #1. In this example, the instruction-bit-restoring decoder 13 decodes "register type 1" and "register type 2" and, based on these "register type 1" and "register type 2", restores the number of instruction bits (=n) for specifying a relevant register ri. This is done so in order to equalize a length of an instruction to the number of bits before compression so that based on this instruction, plural registers ri etc. may be specified. The above-mentioned instruction control signal S4 is output to an instruction read state machine 52. To the above-mentioned register array 11' and instruction-bit-restoring decoder 13, an instruction execution/operation portion 50' is connected. The instruction execution/operation portion 50', based on a program with a predetermined instruction length restored by the instruction-bit-restoring decoder 13, specifies the relevant register ri in the register array 11' to perform arbitrary operations.

The instruction execution/operation portion 50' has an arithmetic/logic unit (hereinafter abbreviated as ALU) 12, an execution state machine 51, an instruction read state machine 52, a selector 53, a program counter (PC) 54, a plus-1 incrementer55, an inputting selector 59, and latch circuits 58, 510, and 511', thereby performing the register-to-register addressing processing. To the register array 11, a data signal line L20 is connected, through which the ALU12 is connected. The ALU12 performs operations on a value such as X or Y read from a register specified in the register array 11'. A value of an operation result is Z. Such operation types are performed as addition, multiplication, subtraction, division, etc. The operation types are set on the basis of an ALU control signal S35 output from the execution state machine 51. To the data signal line L20, the ALU12 as well as latch circuits 58, 511, 59, etc. are connected. Through the data signal line L20, DATA, an augend X value, an addend X value, etc. are transmitted.

The execution state machine 51 and the instruction read state machine 52 are connected to the instruction-bit-restoring decoder 13 so that the register array 11' and the ALU12 may be controlled in order to execute an operation instruction decoded by the instruction-bit-restoring decoder 13. The instruction read state machine 52 controls the program counter 54 and the execution state machine 51 based on the instruction control signal S4 output from the instruction-bit-restoring decoder 13. For example, this machine 52 outputs instruction execution start signal S29, to which the instruction-bit-restoring decoder 13 outputs the instruction signal S9 and each augment signal S10.

To the execution state machine 51, the register array 11', the ALU12, the latch circuits 58, 510, and 511, and the selector 59 are connected. This machine 51 starts execution of an instruction based on an instruction execution start signal S29. For example, to write data, a write control signal Sw is output to the register array 11' and a selection control signal S24 is output to the selector 59. To read data, a read address Ar is output to the register array 11'. To perform an operation, a latch control signal S34 is output to the latch circuit 58 and a latch control signal S38 is output to the latch circuit 510. To an outside of this processor, an external control signal S16 is output. When execution of the instruction is finished, the execution state machine 51 outputs an execution end signal S26 to the state machine 52, so that a value of the program counter 54 is incremented.

To this execution state machine 51 and the instruction read sate machine 52, the selector 53 is connected so that either an increment output signal S7 or a branch-off control signal S27 may be selected on the basis of a selection control signal S28 and output to the program counter 54 as a selector output. The selection control signal S28 is supplied from the execution state machine 51. The increment output signal S7 is output from the incrementer 55 to the selector 53. The program counter 54 specifies a location from which an compressed program AP is read from the ROM14 based on a count control signal S30. The plus-1 incrementer 55 increases a value of the count output signal S5 of the program counter 54 by "1" (+1) for incrementing. The count control signal S30 is supplied from the instruction decoding state machine 52. The count output signal S5 is output to the plus-1 incrementer 55 as well as the ROM14.

The selector 59 is connected to a data bus 19A, the register array 11', and the ALU12, to input and control any one of data (DATA) taken in from the data bus 19A, an augend X value (addend Y value) output from the register array 11', and operation result value Z output from the ALU12 based on the selection control signal S24. The latch circuit 58 is connected between a read port of the register array 11' and the ALU12, to latch an output value X of a register ri based on a latch control signal S34. The latch circuit 510 is connected to an comparison output portion etc. in the ALU12, to latch a coincidence detection signal S22 based on the latch control signal S38, thereby outputting a flag condition signal S23. The latch circuit 511 is connected between the read port of the register array 11' and an address bus 19B, to latch an external address based on a latch control signal S17.

Note here that if a jump (branch-off) operation is generated as a result of execution of an instruction, the branch-off control signal S27 that indicates a jump destination address is output from the execution state machine 51 to the selector 53. The selector 53, based on the selection control signal S28, selects the branch-off control signal S27 so that this branch-off control signal S27 may be written to the program counter 54. Further, to the execution state machine 51, the selector 59, the data signal line L20, and the latch circuit 511, the external memory 2 is connected via an I/O interface 60. This is done so in order to operate the ALU12 based on the register-to-register addressing processing. The I/O interface 60 and the external memory 2 are connected to each other through the data bus 19A, the address bus 19B, and a control bus 19C, in such a manner that data is transferred through the data bus 19A, an address is transferred through the address bus 19B, and an external control signal S16 is transferred through the control bus 19C to the external memory 2. This is done so in order to control the external memory 2. As the external memory 2, for example, a 512-megabytes×32-bit random access memory (RAM) is used.

Figure 16:
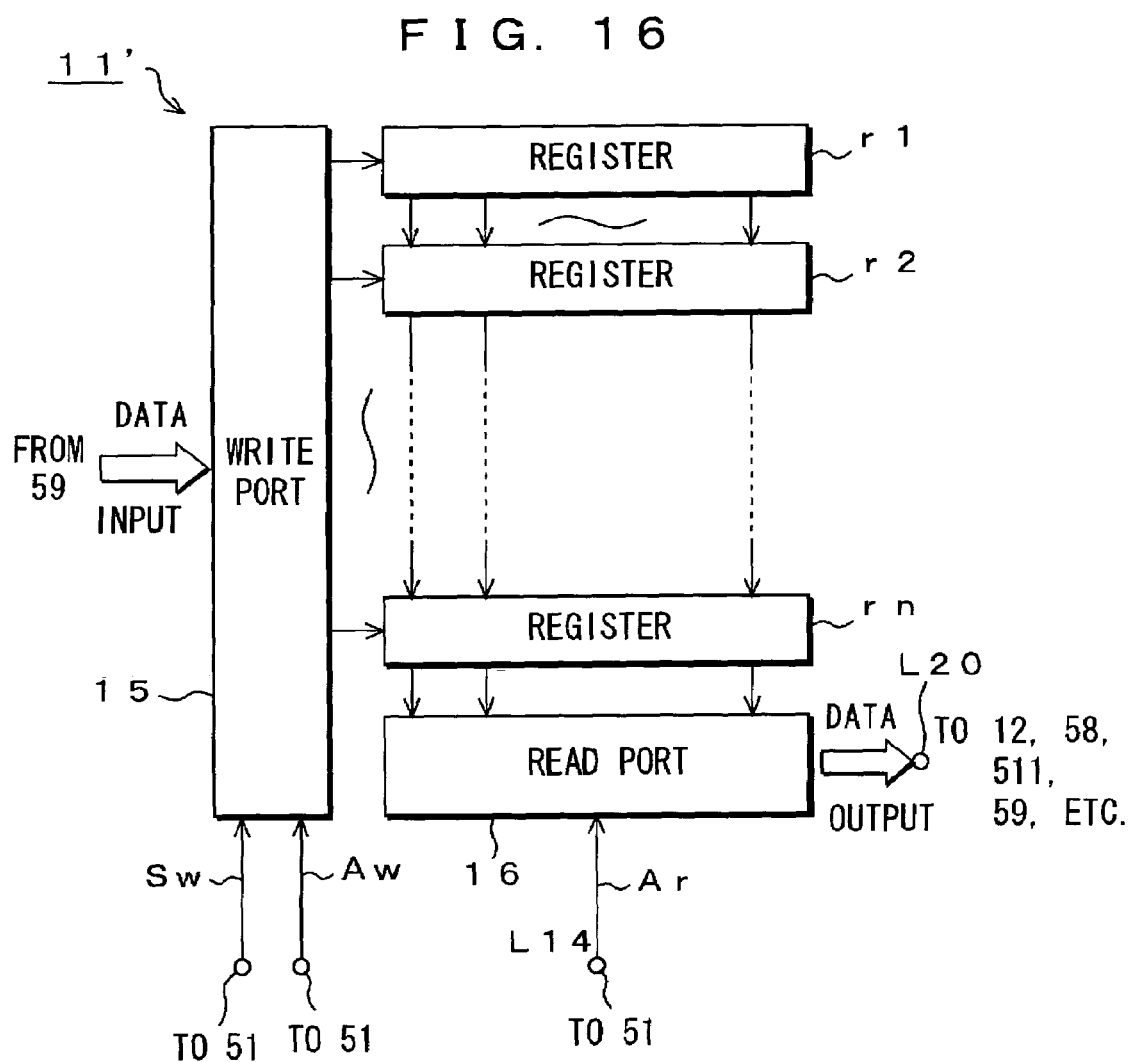
FIG. 16 is a block diagram for showing an internal configuration of a register array 11'.

FIG. 16 is a block diagram for showing an internal configuration of the register array 11'. The register array 11' shown in FIG. 16 is provided with, for example, 8192 32-bit registers ri (i=0-8191), to an input of each of the registers, ri, a write port is connected. A 1-bit register is constituted of a D-type flip-flop circuit etc. The write port 15 is connected to the selector 59 shown in FIG. 15, to write into registers, r0-ri, any one of data (DATA) taken in from the data bus 19A, an augend X value (or addend Y value) output from the register array 11', and an operation result value Z output from the ALU12 based on a write control signal Sw and a write address Aw. The write port is connected to the execution state machine 51 to supply a write address Aw. To an output of each register, ri, a read port 16 is connected. The read port 16 is connected through the data signal line L20 to the ALU12, the latch circuits 58 and 511, the selector 59, etc. shown in FIG. 15, to read data (DATA) from a register, ri specified on the basis of a read address Ar. The read port 16 is connected to the execution state machine 51 to supply the read address Ar.

The following will describe structure examples of instructions set to the ROM14 with reference to FIGS. 17A-17E and FIGS. 18A-18D. There are five instruction patterns #F1-#F5 as the above-mentioned instruction patterns set to the ROM 14 as shown in FIG. 17A-17E. In the microprocessor 101, instructions having the instruction patterns #F2-#F4 are restored to those having the instruction pattern #F1 and handled. Instructions having those instruction patterns #F1-#F5 are roughly divided into two types, that is, load, add, and cmp instructions and a jump instruction. In the instruction patterns #F1-#F4, code "0" is written to a load instruction, code "1" is written to an add instruction, and code "2" is written to a amp instruction, as shown in FIG. 18A. Instruction pattern #F5 is of a jump instruction, to which code "3" is written. If a cmp instruction comes with an agreement as a result of comparison, a zero flag is set to "1" based on the flag condition signal S23 of the latch circuit 510 shown in FIG. and, otherwise, "0" is set to it.

In this example, load, add, and omp instructions each have a 5-bit length if a number of a register ri to be accessed is represented in five bits and, otherwise, have a 13-bit length. That is, the 0'th register r0 through the 31'st register, r31 that have a higher use frequency are each represented in m (=5) number of bits. The 32'nd register, r32 through the 8191'st register, r8191 are represented in n (=13) number of bits. An instruction having the instruction pattern #F1 has a 32-bit length, so that an instruction for a register, ri indicated by "register No. 1" has n (=13) number of bits and an instruction for a register, ri indicated by "register No. 2" also has m (=13) number of bits. The instruction having the instruction pattern #F2 has a 24-bit length, so that an instruction for a register, ri indicated by "register No. 1" has m (=5) number of bits and an instruction for a register, ri indicated by "register No. 2" has m (=13) number of bits.

Further, an instruction having the instruction pattern #F3 has a 24-bit length, so that an instruction for a register, ri indicated by "register No. 1" has n (=13) number of bits and an instruction for a register, ri indicated by "register No. 2" has n (=5) number of bits. An instruction having the instruction pattern #F4 has a 16-bit length, so that an instruction for a register, ri indicated by "register No. 1" has m (=5) number of bits and an instruction for a register, ri indicated by "register No. 2" also has m (=5) number of bits. In each of the instruction patterns #F1-#F4, the starting two bits indicate an instruction type. The instruction type comes in load for transfer, add for addition, amp for comparison, or jump for control shift (branch-off). In the case of load, add, and cmp instructions, each of them is followed by 2-bit access methods #1 and #2. In an operand, the left side indicates the access method #1 represented by "register No. 1" and the right side indicates access method #2 represented by "register No. 2".

That is, the access method #1 indicates a method for accessing a register, ri indicated by "register No. 1" and the access method #2 indicates a method for accessing a register, ri indicated by "register No. 2". The access methods #1 and #2 correspond to register Nos. 1 and 2 respectively, and processing is performed therebetween. For each of the access methods #1 and #2, two types are prepared as shown in FIG. 18B. In the access methods #1 and #2, if code "0" is written, a register, ri indicated by register No. 2 is accessed directly. It means that a value of the register, ri indicated by this register No. is used directly. In the access methods #1 and #2, if code "1" is written, a value of a register, r1 indicated by "register No. 1" is used as an address to access the external memory 2 from this microprocessor 101 (see FIG. 18B).

Further, in FIGS. 17A-17D, the access methods #1 and #2 are followed by "register type 1" and "register type 2" that are represented in two bits. The "register type 1" indicates a type of a register, ri indicated by "register No. 1" and the "register type 2" indicates a type of a register, ri indicated by "register No. 2". Two register types are prepared as shown in FIG. 18C. In the "register type 1" and "register type 2", if code "0" is written, such a register, ri is indicated as to have a register No. of "31" or lower and a higher use frequency. A register No. of this register ri (i=0-31) can be represented in m (=5) number of bits. In the "register type 1" and "register type 2", if "1" is written, such a register, ri is indicated as to have a register No. of "32" or higher and a lower use frequency. A register No. of this register ri (i=32-8191) can be represented in n (=13) number of bits. By thus distinguishing the magnitude of the register No., a program can be compressed. These "register type 1" and "register type 2" are followed by "register No. 1" and "register No. 2" in this order. "Register No. 1" indicates, for example, a register, ri which holds an augend and "register No. 2" indicates a register ri which holds an addend.

Further, according to a jump instruction format shown in FIG. 17E, an instruction is written in starting two bits, followed by a 2-bit flag condition. In the following 20 bits, a jump address is written. As shown in FIG. 18D, a flag condition is used to decide whether instruction execution control should be shifted. Code "0" indicates that control is shifted "unconditionally" always. Code "1" indicates that control is shifted when "1" is set to the zero flag. Code "2" indicates that control is shifted when "0" is set to the zero flag. Code "3" is not used.

The following will describe an example of processing in the program creation system I. FIG. 19 is a table for showing an example of creating a program in the program creation system I. In FIG. 19, P1 is an image of a program-describing screen, P2 indicates contents thus described, and P3 is a description of the corresponding conditions in the embodiment. This is because a compressed program may be created by editing, in the program creation device 200 shown in FIG 13 instructions to execute operation processing based on an operation program that performs the register-to-memory addressing processing based on a predetermined programming language.

In the program creation device 200, on a display device 24 shown in FIG. 13, the program-describing screen P1 based on the C language shown in FIG. 19 is displayed, thus creating a compressed program using the keyboard 22 and the mouse 23. In this case, data required to create the program for the microprocessor 101 is read from the database 21. For example, "global variable declaration", "function declaration", "local variable declaration", "substitution", "addition", "comparison", and "branch-off", which are necessary for creation of a program in the C language, are read. In this example, in a case where 32-bit registers, ri are used as many as N (=8192) in the microprocessor 101 related to a new design and manufacture, when the 8192 registers, ri are assigned serial numbers of 0 through 8191, "local variable declaration" is performed on registers, r0-r31 of a group comprising the 0'th through 31'st registers as a group having a higher use frequency.

That is, in this example, "local variable declaration" is assigned to the 31'st and lower-numbered registers, ri. Further, "global variable declaration" is performed on registers, r32-r8191 of a group comprising the 32'nd through 8191'st registers as a group having a lower use frequency. That is, "global variable declaration" is assigned to the 32=nd and higher-numbered registers ri. In the program creation device 200, if. the number of bits of an instruction for registers, r32-r8191 of the group comprising the 32'nd through 8191'st registers on which "global variable declaration" has been performed is set to n (=13), the number of bits of an instruction for registers, r0-r31 on which local variable declaration has been performed is reduced to m (=5), which is smaller by eight bits. Besides, "register type 1" and "register type 2" are written into an instruction structure of this program, to create a compressed program AP having a different instruction length.

A control device shown in FIG. 13 varies the length of an instruction in accordance with a use frequency of the registers, ri. In this example, instructions having a smaller number of bits (m=5) are set to registers, r0-r31 having a higher use frequency and instructions having a larger number of bits (n=13) are set to registers, r32-r8191 having a lower use frequency. It is thus possible to set instructions having a shorter length to frequently accessed registers, r0-r31, thereby reducing a memory capacity of the program storing ROM14 mounted to the microprocessor 101.

Figure 20:
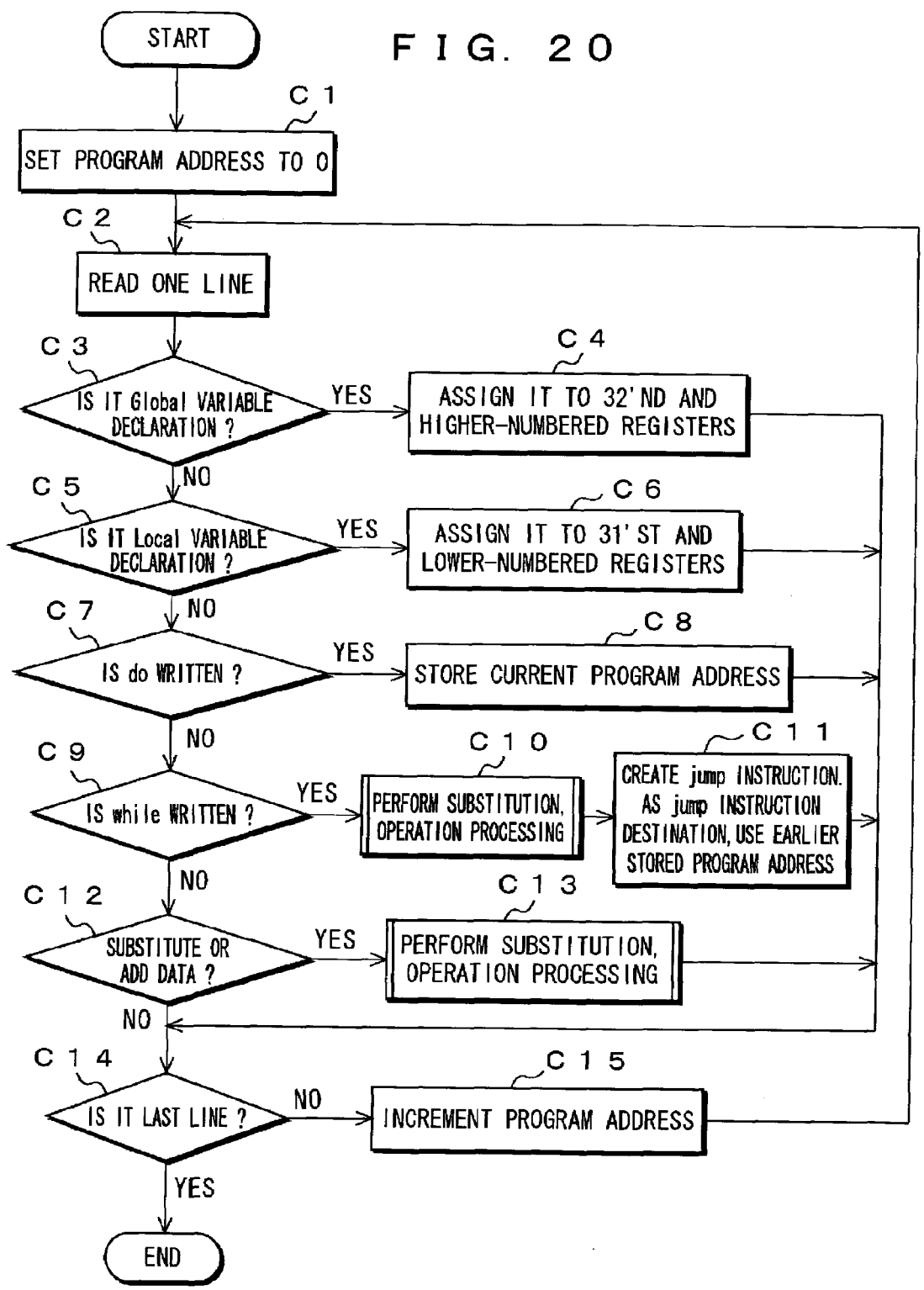
FIG. 20 is a flowchart (main routine) for showing an example of compilation in a program creation device 200.
Figure 21:
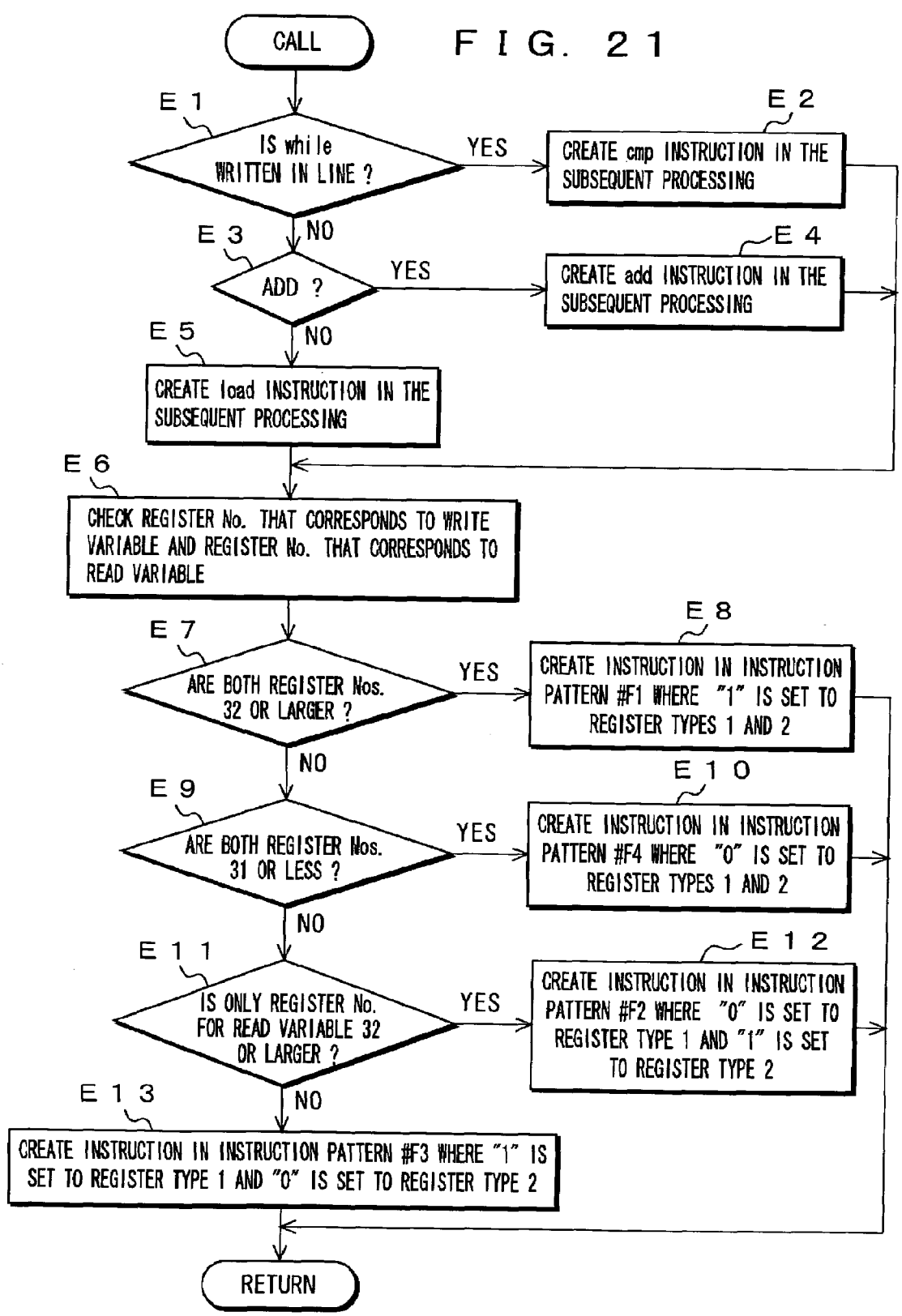
FIG. 21 is a flowchart (subroutine) for showing an example of substitution and operation processing in a compiler.

The following will describe an example of compilation in the program creation device 200. FIG. 20 is a flowchart (main routine) for showing an example of compilation in the program creation device 200. FIG. 21 is a flowchart (subroutine) for showing an example of substitution and operation processing in a compiler.

In this embodiment, it is assumed that a compressed program is created by editing instructions to perform operation processing based on an operation program which performs the register-to-memory addressing processing based on a program created in the C language in the program creation system I. Further, such a case is assumed that the microprocessor 101 uses 8192 registers, r0-r8191, which are assigned serial numbers of 0 through 8191. Under these processing conditions, the program creation system I sets a program address to "0" at step C1 of the flowchart of FIG. 20 in order to edit instructions based on the program created in the C language. Then, the process shifts to step C2 to read one line of the program created in the C language. In this case, on the program describing screen P1 of the display device 24, for example, "global variable declaration" is displayed as follows:

```
int *read_add *write_add, counter, end_val;
Further, function declaration is displayed as follows:
void main ( )
{
```

At step C3, the process checks on whether contents described in this program are "global variable declaration". If the described contents are "global variable declaration", the process shifts to step C4 to allocate it to the 32'nd and higher-numbered registers, r32-r8191. Assuming the number of bits of an instruction which specifies any one of this group of registers r32-r8191 to be m, m=13. The instruction is created according to the instruction pattern #F1. Then, the process shifts to step C14. Further, if it is decided at step C3 that the described contents are not "global variable declaration", the process shifts to step C5 to check on whether the described contents are "local variable declaration". In this case, on the program-describing screen P1 of the display device 24, for example, "local variable declaration" is displayed as follows:

```
int temp, added_val;
```

If the described contents are "local variable declaration", the process shifts to step C6 to allocate it to the 31'st and lower-numbered registers, r0-r31. This is done so in order to reduce the number of bits (n) of an instruction which specifies the register ri to five bits, which is smaller by eight bits than that for registers, r32-r8191 on which "global variable declaration" has been performed because these registers, ri are used frequently. The instruction is created according to any one of the instruction patterns #F2 through #F4. Then, the process shifts to step C14.

If it is decided at step C5 that the described contents are not "local variable declaration", the process shifts to step C7 to check on whether "do" indicating execution of the processing such as substitution or addition is written in the C-language program. In this case, on the program-describing screen P1 of the display device 24, for example, "do" is displayed as follows:

```
do{
    temp = *read_add;
    temp = temp + added_val;
    *write_add = temp
    read_add = read_add + added_val;
    write_add = write_add + added_val;
    counter = counter + added_val;
}
```

If such "do" as to indicate execution of the processing such as substitution or addition is written, the process shifts to step C8 to store the current program address. Then, the process shifts to step C14.

If it is decided at step C7 that "do" is not written, the process shifts to step C9 to check on whether "while" indicating processing in the period is written in the C-language program. In this case, on the program-describing screen P1 of the display device 24, for example, "while" is displayed as follows:

while (counter !=end_val);

If such "while" as to indicate processing comparison or branch-off is written, the process shifts to step C10 to perform substitution or operation processing. For example, the process calls the subroutine shown in FIG. 21, to check at step E1 of this flowchart on whether "while" is written in a current line in the C-language program. If "while" is written in the line, the process shifts to step E2 to create a amp instruction as an instruction to be created in the subsequent processing. Then, the process shifts to step E6.

If it is decided at step E1 that "while" is not written in the line, the process shifts to step E3 to check on whether the operation processing is addition. If such is the case, the process shifts to step E4 to give an add instruction to be created in the subsequent processing. Otherwise, the process shifts to step E5 to give a load instruction to be created in the subsequent processing. Then, the process shifts to step E6. At step E6, the process checks a register No. that corresponds to a variable to be written into a register, ri, and a register No. of a register ri that corresponds to a variable to be read from the register array 11'. This is done so in order to determine a write address Aw and a read address Ar. Then, the process shifts to step E7.

At step E7, the process decides whether both of the register Nos. are not less than "32". If such is the case, the process shifts to step E8 to generate an instruction according to the instruction pattern #F1 shown in FIG. 17A. In this instruction pattern #F1, "1" is written to "register type 1" and "register type 2". In this case, these "register type 1" and "register type 2" are written in the instruction structure of the compressed program. For example, "1" is written to "register type 1" and "register type 2" concerning the registers, r32-r8191 of the group comprising the 32'nd through 8191'st registers. Then, the process returns to step C10 of the main routine shown in FIG. 20.

If it is decided at step E7 that neither of the register Nos. is "32" or larger, on the other hand, the process shifts to step E9 to check on whether each of both register Nos. is not larger than "31". If both of the registers is not larger than "31", the process shifts to step E10 to generate an instruction according to the instruction pattern #F4 shown in FIG. 17D. In this instruction pattern #F4, "0" is written to "register type 1" and "register type 2". In this case, "register type 1" and "register type 2" are written in the instruction structure of the compressed program. For example, "0" is written to "register type 1" and "register type 2" concerning the registers, r0-r31 of the group comprising the 0'th through 31'st registers. Then, the process returns to step C10 of the main routine shown in FIG. 20.

If neither of both register Nos. is "31" or less, on the other hand, the process shifts to step E11 to check on whether a number of a register, ri having a variable read from the register array 11' is not less than "32". If such is the case, the process shifts to step E12 to generate an instruction according to the instruction pattern #F2 shown in FIG. 17B. In this instruction pattern #F2, "0" is written to "register type 1" and "1" is written to "register type 2". Then, the process returns to step C10 of the main routine shown in FIG. 20.

Furthermore, if the number of the register, ri of the variable read from the register array 11' is less than "32", the process shifts to step E13 to generate an instruction according to the instruction pattern #F3 shown in FIG. 17C. In this instruction pattern #F3, "1" is written to "register type 1" and "0" is written to "register type 2". Then, the process returns to step C10 of the main routine shown in FIG. 20. Then, the process shifts to step C11 to generate a jump instruction. As a jump destination of this jump instruction, the previously stored program address is used. Then, the process shifts to step C14.

If "while" has not been written at the above-mentioned step C9, the process shifts to step C12 to check on whether the C-language program substitutes or adds data. In the cases of data substitution or addition, the process shifts to step C13 to substitute or add the data respectively. At this step C13, the process calls the subroutine shown in FIG. 21, goes through steps E1-E13 of the flowchart, and returns to step C13 of the main routine shown in FIG. 20. Then, the process shifts to step C14.

If it is decided at step C12 that the C-language program neither substitute nor add data, the process shifts to step C14. At step C14, the process decides whether the current line is the last one in the C-language program. If it is not the last line, the process shifts to step C15 to increment the program address. Then, the process returns to step C2 to repeat the above-mentioned compilation processing. If the current line is the last one, the process ends this compilation processing. It is thus possible to create such a compressed program AP with a different instruction length that the instruction patterns may be #F1-#F5 as shown in FIGS. 17A-17E. In this compressed program AP, the number of bits of an instruction which specifies any one of registers, r0-r31 of the group comprising the 0'th through 31'st registers is m (=5) and the number of bits of an instruction which specifies any one of registers, r32-r8191 of the group comprising the 32'nd through 8191'st registers is n (=13).

The following will describe an example of processing in the program execution system II. FIG. 22 is a table for showing examples of operation instructions executed by a restored operation program. FIG. shows examples of a condition of registers, r0, ri, . . . , r32, r33, r34, r35, etc and FIG. 24 shows examples of storing data in the external memory 2. In this example, two sets of 10-memory cell arrays are prepared such as shown in FIG. 24 in the external memory 2 connected to the operation-processing device 100'. One of them is memory array #M1 and the other is memory array #M2. Such an example of operation processing is given that based on eight operation instructions #I1-#I8 shown in FIG. 22, "1" is added to a value stored in the one memory array #M1 and the result is stored in the other memory array #M2.

The operation instructions #I1-#I8 shown in FIG. 22 are those of an operation program obtained after the compressed program AP stored in the ROM14 is restored. In this operation program, as shown in FIG. 23, there are two registers, ri that have a high access frequency, so that they are assigned as r0 and r1 respectively. It has thus been possible efficiently compress the program as compared to the operation program before its length has been compressed as a whole. Further, in FIG. 23, the register indicated by register number r0 is used temporarily and added value "1" is stored in the register that indicated by register No. r1. Further, write address "0" is stored in the register indicated by register No. r32, write address "10" is stored in the register indicated by register No. r33, counter initial value "0" is stored in the register indicated by register No. r34, the number of times of operations (end value) "10" is stored in the register indicated by register No. r35.

The operation instructions #I1-#I8 shown in FIG. 22 indicate expressions by means of mnemonics, expressions by means of the machine language, and processing contents. In an instruction structure shown in FIG. 22, operation instruction #I1 is load, r0, (r32) represented by 140020h in the machine language, having contents that a value read from the external memory 2 should be stored to register r0 with the value of register r32 of the register array 11' as an address. Its operation is, for example, such that if a value of register r32 is "0", data "0" of memory array #M1 which is the content of a read address "0" of the external memory 2 is read and this data "0" is written into register r0.

Operation instruction #I2 goes as add r0, r1 represented by 4001h in the machine language, having contents that a value of register r1 should be added to the register, r0 of the register array 11' and its result should be stored in the register, r0. Its operation is such that "1" which is a value of the register, r1 is added to contents "0" of the register, r0 and its result "1" is written into the register, r0. Operation instruction #I3 goes as load, (r33), r0 represented by 280420h in the machine language, having contents that a value of the register, r33 of the register array 11' is used as an address to write a value of the register, r0 into the external memory 2. Its operation is such that data "1" is written to an address of the memory array #M2 in the external memory 2 indicated by the register, r33.

Operation instruction #I4 goes as add, r32, r1 represented by 480401h in the machine language, having contents that a value of the register, r1 should be added to the register, r32 of the register array 11' and its result should be stored in the register, r32. Its operation is such that "1" which is a value of the register, r1 is added to contents "0" of the register, r32 and its result "1" is written into the register, r32. Operation instruction #I5 goes as add, r33, r1 represented by 480421h in the machine language, having contents that a value of the register, r1 should be added to the register, r33 of the register array 11' and its result should be stored in the register, r33. Its operation is such that "1" which is a value of the register, r1 is added to contents "0" of the register, r33 and its result "1" is written into the register, r33.

Operation instruction #I6 goes as add, r34, r1 represented by 480441h in the machine language, having contents that a value of the register, r1 should be added to the register, r34 of the register array 11' and its result should be stored in the register, r34. Its operation is such that "1" which is a value of the register, r1 is added to contents "0" of the register, r34 and its result "1" is written into the register, r34. By these operation instructions #I4-#I6, at the counter in the execution state machine 51, "1" is added in terms of read address Ar and write address Aw. Operation instruction #I7 goes as cmp, r34, r35 represented by 8C044023h in the machine language, having contents that contents of the register, r34 and those of the register, r35 of the register array 11' should be compared to each other and, if they agree, "1" is set to the zero flag and, otherwise, "0" is set to it. Its operation is such that "1" which is a value of the register, r34 and "10" which is a value of the register, r35 do not agree and, therefore, "0" is set to the zero flag. A value of the zero flag is held by the latch circuit 510 and referenced by the subsequent instructions.

Operation instruction #I8 goes as jump nz, LOOP represented by E00000h in the machine language, having contents that if the zero flag is "0" in setting, control should be shifted to a label indicated by LOOP. Its operation is such that if the zero flag is "0" in setting, control is shifted to operation instruction #I1. When the above operations are repeated 10 times, register r34 has a value of "10" and "1" is set to the zero flag by the operation instruction #I7, so that control is not shifted by operation instruction #I8, thus ending the operation processing. It is thus possible to efficiently use the ROM14 as compared to a case where the number of bits of instructions for all the registers, r1 are represented by the single method.

Figure 26A:
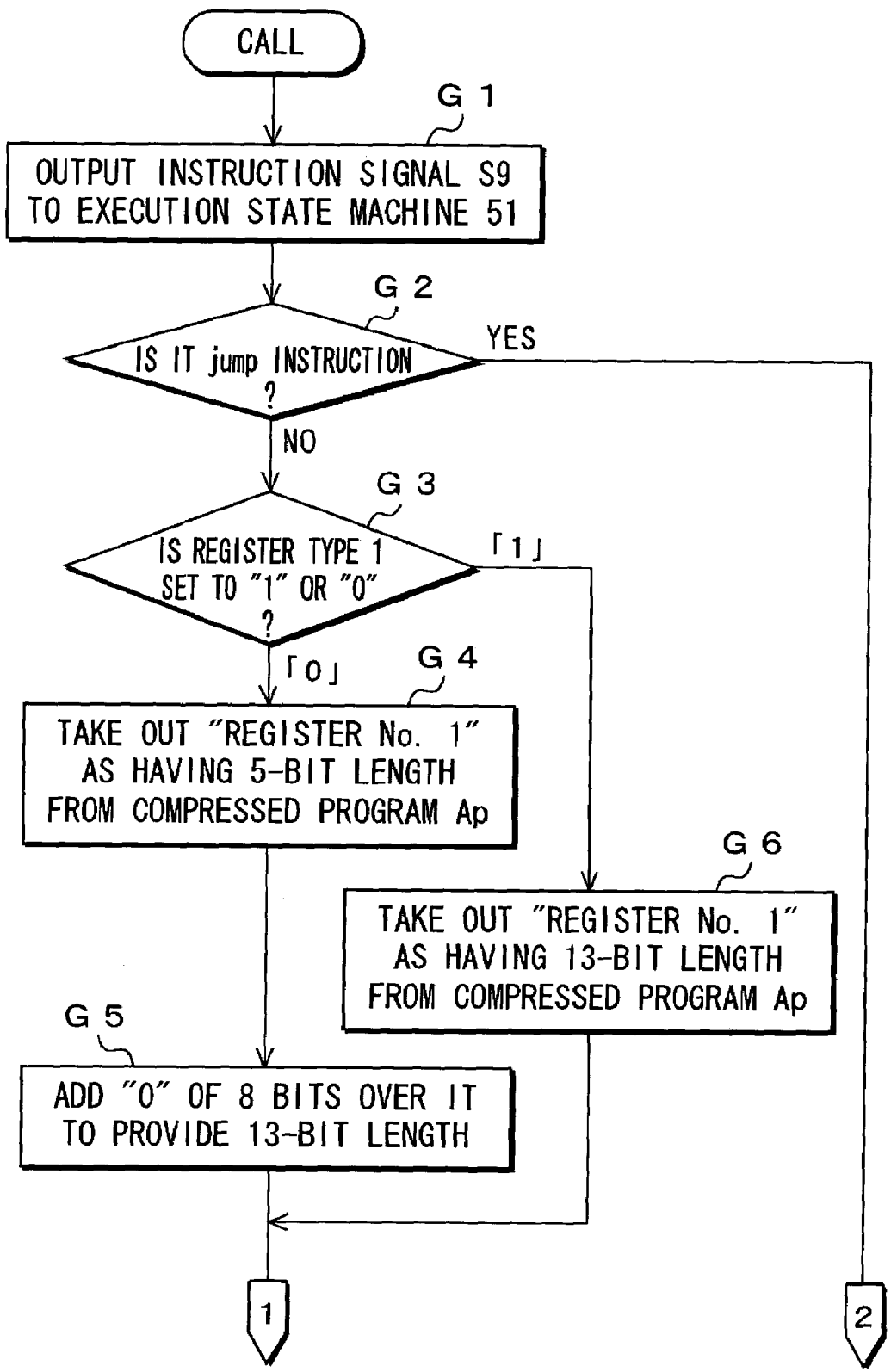

The following will describe an example of operations in the microprocessor 101. FIG. is a flowchart for showing an operation example in the microprocessor 101. FIGS. 26A and 26B are flowcharts for showing an example of processing in the instruction-bit-restoring decoder 13.

In this embodiment, the microprocessor 101 constitutes the program execution system II, to restore an operation program including the operation instructions #I1-#I18 shown in FIG. 22 from a compressed program AP read from the ROM14. In this case, if code "0" is written in "register type 1" and "register type 2" concerning the instruction patterns #F1-#F4, a register No. is expanded by the instruction-bit-restoring decoder 13. In such expansion of the instruction bits, for example, eight bits of "0" are added to the top of the m (=5) number of bits of the instruction of "register No. 1". Based on this operation program, "1" is added to a value of the memory array #M1 in the external memory 2 shown in FIG. 24 and stored in the memory array #M2.

Figure 25:
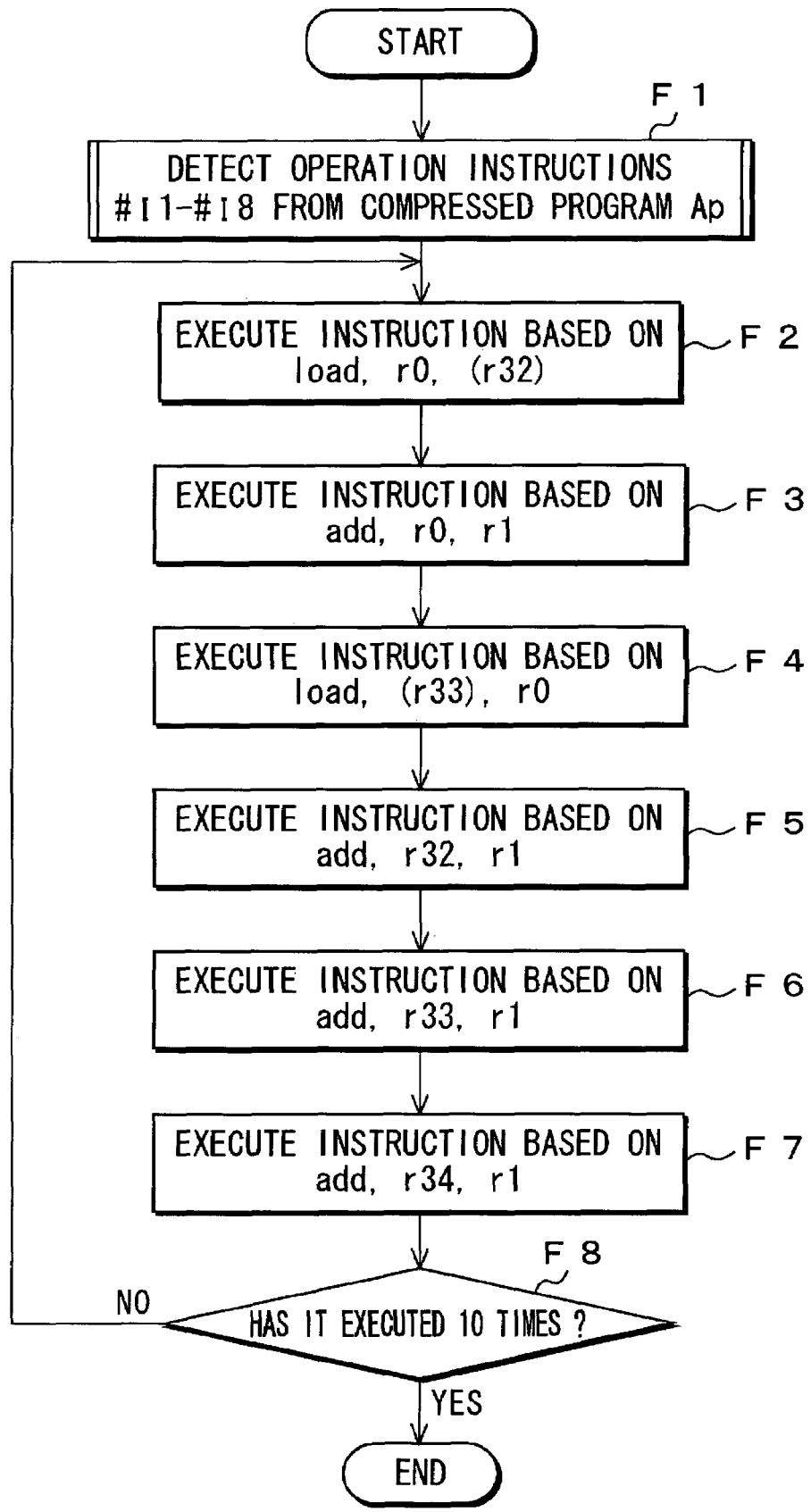
FIG. 25 is a flowchart for showing an operation example in the microprocessor 101.

As for a register condition of the register array 11', as shown in FIG. 23, for example, as for six registers, r0, r1, r32, r33, r34, r35 "undetermined" is set to r0, initial value "1" is set to r1, initial value "0" is set to both r32 and r34, and initial value "10" is set to r33 and r35. To write these values, in the execution state machine 51, a write address Aw is output to the register array 11', to set those initial values "0", "1", and "10". Under these operating conditions, at step F1 of the flowchart shown in FIG. 25, first the instruction-bit-restoring decoder 13 receives compressed programs (which comprise machine-language instructions) AP from the ROM14 sequentially and decodes the programs AP to detect the operation instructions #I1-#I8 having a predetermined instruction length.

This instruction-bit-restoring decoder 13, for example, calls a subroutine shown in FIG. 26A to pick up a portion of instructions at step G1 of its flowchart and output the instruction signal S9 to the execution state machine 51. Besides, the instruction-bit-restoring decoder 13 shifts to step G2 to check on whether a relevant instruction pattern is of a jump instruction. If this instruction pattern is of a jump instruction indicated by #F5, the process shifts to step G12 to output a flag condition and a jump address. Then, the process returns to step F1 of the main routine. If it is decided at step G2 that this instruction pattern is not of a jump instruction, the process shifts to step G3 to check on whether a code written in "register type 1" is "0" or "1" concerning this instruction pattern. If code "0" is written in "register type 1", the process shifts to step G4 to set the number of bits (m) of an instruction for "register No. 1" to five and take it out from the compressed program AP. Then, the process shifts to step G5 to add "0" of the eight bits over the in (=5) number of bits of the instruction for "register No. 1", thereby providing a 13-bit length. Then, the process shifts to step G7 of the flowchart shown in FIG. 26B.

Note here that if it is decided at step G3 that code "1" is written in "register type 1", the process shifts to step G6 to set the number of bits (n) of the instruction for "register No. 1" to 13 and take it out of the compressed program AP. Then, the process shifts to step G7 of the flowchart shown in FIG. 26B to check on whether a code written in "register type 2" is "0" or "1" concerning this instruction pattern. If code "0" is written in "register type 2", the process shifts to step G8 to set the number of bits (m) of an instruction for "register No. 2" to five and take it out of the compressed program AP. Then, the process shifts to step G9 to add "0" of eight bits over the m (=5) number of bits of the instruction for "register No. 2", thereby providing a 13-bit length. Then, the process shifts to step G11.

If it is decided at step G7 that code "1" is written in "register type 2", the process shifts to step G10 to set the number of bits (n) of the instruction for "register No. 2" to 13 and take it out of the compressed program AP. Then, the process shifts to step G11 to detect "register No. 1", "register No. 2", "access method #1", and "access method #2". Then, the process returns to step F1 of the main routine shown in FIG. 25. Therefore, the execution state machine 51 is not provided with "register type 1" nor "register type 2" but provided with the instruction control signal S4, the instruction signal S9, and each augment signal S10 based on the operation instructions #I1-#I8 having a predetermined instruction length.

This instruction signal S9 contains a load instruction, an add instruction, a cmp instruction, and a jump instruction. Each augment signal S10 contains access method #1, access method #2, register Nos. r0, r1, . . . , a flag condition, a jump address, etc. The instruction control signal S4 is output from the decoder 13 to the instruction read state machine 52. Note here that a location (address) in the ROM14 from which a compressed program AP is read is specified by the program counter 54 (PC). Those read operations are controlled by the instruction read state machine 52.

The instruction read state machine 52 controls the program counter 54 and the execution state machine 51 based on the instruction control signal S4 output from the instruction-bit-restoring decoder 13. For example, this machine 52 outputs the instruction execution start signal S29 to the execution state machine 51, to which the instruction-bit-restoring decoder 13 outputs the instruction signal S9 and each augment signal S10. Based on the instruction execution start signal S29, the execution state machine 51 starts execution of an instruction. For example, to write data, the write control signal Sw is output to the register array 11' and the selection control signal S24 is output to the selector 59. To read data, a read address Ar is output to the register array 11'.

To perform an operation, the latch control signal S34 is output to the latch circuit 58. To the latch circuit 510, the latch control signal S38 is output. To the outside of this processor, the external control signal S16 is output. When execution of an instruction is finished, the execution state machine 51 outputs the execution end signal S26 to the instruction read state machine 52, to increment the value of the program counter 54. The program counter 54 specifies, based on the count control signal S30, a location of the ROM14 from which the compressed program AP is read. The plus-1 incrementer 55 increments the count output signal S5 of the program counter 54 by one (+1).

At step F2, the execution state machine 51, when having received the operation instruction #I1 under the control of the instruction read state machine 52 in terms of instruction reading, outputs the write signal S16 to the external memory 2 based on load, r0, (r32) represented by 140020h in the machine language. This value is used as a read address Ar for the register array 11'. The register array 11' outputs a 32'nd value to the data signal line L20. This value is held in the latch circuit 511 and output via the address bus 19B to the external memory 2. Then, a value of the register, r32 in the register array 11' is used as an address to store a value read from the external memory 2 into the register, r0. In this case, the register, r32 has a value of "0", so that data "0" of memory array #M1 which is contents of address "0" of the external memory 2 shown in FIG. 24 is read and written into register r0.

That is, the data of an address (location) transferred through the address bus 19B from the external memory 2 is output to the selector 59. The execution state machine 51 outputs the selection signal S24 so that this data may be selected. Accordingly, the data is input to the register array 11'. The execution state machine 51 outputs a write address Aw (="0") to the register array 11'. Then, the execution state machine 51 uses the write signal Sw to actually instruct writing of an operation result value. Then, at step F3, the execution state machine 51, when having received the operation instruction #I2 under the control of the instruction read state machine 52 in terms of instruction reading, based on add, r0, r1 represented by 4001h in the machine language, adds a value of the register, r1 to the register, r0 in the register array 11' and stores its result in register r0. In this case, "1" which is a value of the register, r1 is added to "0" which is contents of the register, r0 and its result "1" is written into the register, r0.

At step F4, the execution state machine 51, when having received the operation instruction #I3 under the control of the instruction read state machine 52 in terms of instruction reading, uses as an address a value of the register, r33 in the register array 11' based on load, (r33), r0 represented by 280420h in the machine language and writes a value of the register, r0 into the external memory 2. In this case, data "1" is written to an address of the memory array #M2 in the external memory 2 indicated by the register, r33. Then, at step F5, the execution state machine 51, when having received the operation instruction #I4 under the control of the instruction read state machine 52 in terms of instruction reading, adds a value of the register, r1 to the register, r32 in the register array 11' based on add, r32, r1 represented by 480401h in the machine language and stores its result in the register, r32. In this case, "1" which is a value of the register, r1 is added to "0" which is contents of the register, r32 and its result "1" is written to the register, r32. By this operation instruction #I4, "1" is added to the read address Ar and the write address Aw in the counter in the execution state machine 51.

At step F6, the execution state machine 51, when having received the operation instruction #I5 under the control of the instruction read state machine 52 in terms of instruction reading, adds a value of the register, r1 to the register, r33 in the register array 11' based on add, r33, r1 represented by 480421h in the machine language and stores its result in the register, r33. In this case, "1" which is a value of the register, r1 is added to "0" which is contents of the register, r33 and its result "1" is written to the register, r33. By this operation instruction #I5, "1" is added to the read address Ar and the write address Aw in the counter in the execution state machine 51. Then, at step F7, the execution state machine 51, when having received the operation instruction #I6 under the control of the instruction read state machine 52 in terms of instruction reading, adds a value of the register, r1 to the register, r34 in the register array 11' based on add, r34, r1 represented by 480441h in the machine language and stores its result in the register, r34. In this case, "1" which is a value of the register, r1 is added to "0" which is contents of the register, r34 and its result "1" is written to the register, r34. By this operation instruction #I6, "1" is added to the read address Ar and the write address Aw in the counter in the execution state machine 51.

In this example, at step F8 the process decides whether the processing has been repeated as many times as a value (=10) indicated by the register, r35. For example, when having received the operation instruction #I7 under the control of the instruction read state machine 52 in terms of instruction reading, the execution state machine 51 compares contents of the register, r34 and those of the register, r35 to each other based on cmp, r34, r35 represented by 8C044023h in the machine language and, if they agree, sets "1" to the zero flag and, otherwise, sets "0" to it. In this case, "1" and "10" which are values of the registers, r34 and r35 respectively do not agree, "0" is set to the zero flag. The value of the zero flag is held in the latch circuit 510 and referenced by the subsequent instructions. Then, when having received the operation instruction #I8 under the control of the instruction read state machine 52 in terms of instruction reading, based on jump nz, LOOP represented by E00000h in the machine language, the execution state machine 51 shifts control to a label indicated by LOOP if the zero flag is "0" in value. If the zero flag is "0" in value, it shifts control to the operation instruction #I1 at step F2. When it is decided at step F8 that these operations have been repeated 10 times, "10" is set to register r34 and "1" is set to the zero flag by the operation instruction #I7, so that control does not shift by the operation instruction #I8, thus ending the operation processing.

As described above, by the microprocessor 101 according to the fourth embodiment related to the present invention, the number of bits of an instruction which specifies a relevant register, r1 from among 8192 registers, r0-r8191 based on its use frequency is reduced beforehand and data is processed based on a compressed program AP having a different instruction length in which "register type 1" and "register type 2" are written in its instruction structure. The ROM14 stores a compressed program AP for specifying the relevant register, r1 from among 8192 registers, r0-r8191. The instruction-bit-restoring decoder 13 reads the compressed program AP from this ROM14 to decode "register type 1" and "register type 2", and to restore, based on these "register type 1" and "register type 2", the number of bits of the instruction to specify this register, ri.

Therefore, the compressed program AP has an instruction length which is varied in accordance with a frequency at which the registers, ri are used, so that such compressed program data that a short length instruction is set to frequently accessed registers, r0-r31 can be stored in the ROM14, thus reducing its memory capacity. In this example, the memory capacity can be reduced by as much as 16 bits×32 pieces×the number of instructions as compared to before the program is compressed. It is thus possible to reduce a ratio of an area occupied by such memory cells as to function as the ROM so that the other memory cells may be allocated to the registers as many as possible in a case where the microprocessor 101 is constituted of a PLD comprised of the memory cells and logic operation elements.

Although this embodiment has been described with reference to a case where the external memory 2 is connected to the operation-processing device 100' to constitute the microprocessor 101 to perform operation processing based on an operation program which performs the register-to-memory addressing processing by specifying plural registers, the present invention is not limited to it; as in the case of the first embodiment, operation instructions to perform the register-to-register addressing processing may be executed to perform operation processing based on the compressed program AP. In this case, to the input portion of the register array 11' shown in FIG. 15, the selectors 56 and 57 shown in FIG. 1 may be connected so that these selectors 56 and 57 are controlled by the execution state machine 51. It is thus possible to obtain such effects of the first embodiment that the register array 11 can be operated like a random access memory and an area occupied by a substrate is reduced as well as such effects of the second embodiment that a memory capacity of the ROM etc. for storing program data can be reduced in a condition where they are overlapped with each other.

PROBABILITY OF UTILIZED INDUSTRIALIZATION

The present invention is extremely well applicable to a programmable one-chip microcomputer etc. that can be incorporated in a variety of electronic apparatuses as well as to these built-in electronic apparatuses such as a CPU, an MPU, and a PLD, for processing various data based on an instruction execution program.

The invention claimed is:

1. An operation-processing device for performing operation processing based on an arbitrary operation program, said device comprising:
   a register array having a plurality of registers each for holding an arbitrary value based on a write address and a write control signal and for outputting the held value to a signal line based on a read address;
   an operation portion having an input coupled to said signal line independent of an intervening addressable register such that a value read from said register array to said signal line based on a read address is capable of being provided to said input without further addressing a register, the operation portion being operable for performing an operation on said value read from said register array to said signal line;
   an instruction-decoding portion for decoding an operation instruction from an operation program for operating said operation portion, wherein said operation instruction includes at least one bit indicative of an access method; and
   an instruction-execution-controlling portion for controlling said register array and the operation portion in order to execute an operation instruction decoded by said instruction-decoding portion,
   wherein, in the event said at least one bit is indicative of a first access method, then said instruction-execution-controlling portion is operable for (i) selecting one of said registers of the register array based on said operation instruction, and (ii) based on a value held by said selected register, and without reference to a value previously loaded into another register, performing register-to-register addressing processing for selecting another of said registers of said register array; and
   wherein, in the event said at least one bit is indicative of a second access method, then said instruction-execution-controlling portion is operable for selecting one of said registers based on said operation instruction, and not performing register-to-register addressing processing for selecting, based on a value held by said selected register, another of said registers of said register array.

2. The operation-processing device according to claim 1, further comprising a read only memory in which said operation program is stored.

3. The operation-processing device according to claim 1, wherein said operation program includes an operation instruction to perform the register-to-register addressing processing.

4. The operation-processing device according to claim 2, wherein said register array and the read only memory are each comprised of a plurality of memory cells;

wherein said operation portion, the instruction-decoding portion, and the instruction-execution-controlling portion are comprised of a plurality of arithmetic/logic operation elements; and wherein said memory cells and the arithmetic/logic operation elements comprise a programmable logic device and are formed on an identical semiconductor chip.

5. The operation-processing device according to claim 1, wherein said instruction execution-controlling portion comprises:

a first selector for selecting any one of a read execution address to select said selected register and a read address to select said selected register again; and a second selector for selecting any one of a write execution address to select said selected register and a write address to select said selected register again.

6. The operation-processing device according to claim 1, wherein said input comprises at least one input signal line that is coupled to said signal line via a latch.

7. An operation-processing method for performing operation processing based on an arbitrary operation program, said method comprising:

accessing a register array having a plurality of registers, each for holding an arbitrary value based on a write address and a write control signal and for outputting the held value to an input of an operation portion based on a read address without further addressing a register;

decoding an operation instruction from said operation program, said operation instruction including at least one bit indicative of an access method;

selecting one of said registers of said register array based on said operation instruction;

in the event that said at least one bit is indicative of a first access method, (i) performing register-to-register addressing processing for selecting, based on a value held by said selected register, and without reference to a value previously loaded into another register, another of said registers of said register array, and (ii) performing with said operation portion an operation on a value held by said selected another register; and in the event that said at least one bit is indicative of a second access method, performing with said operation portion an operation on a value held by said selected register, and not performing register-to-register addressing processing for selecting, based on a value held by said selected register, another of said registers of said register array.

8. The operation-processing method according to claim 7, wherein a result of said operation is stored in the register selected on the basis of the value held by said selected another register.

9. The operation-processing method according to claim 7, wherein said operation program includes an operation instruction to perform said register-to-register addressing processing.

* * * * *